United States Patent
Moro et al.

(10) Patent No.: US 11,893,450 B2
(45) Date of Patent: Feb. 6, 2024

(54) ROBUST OPTICAL AIMER FOR TRIANGULATION-BASED DISTANCE MEASUREMENT

(71) Applicant: Datalogic IP Tech, S.r.l., Bologna (IT)

(72) Inventors: Mattia Francesco Moro, Venice (IT); Luca Perugini, Bologna (IT); Michele Agostini, Bologna (IT); Simone Spolzino, Granarolo dell'Emillia (IT)

(73) Assignee: Datalogic IP Tech, S.r.l., Bologna (IT)

( * ) Notice: Subject to any disclaimer, the term of this patent is extended or adjusted under 35 U.S.C. 154(b) by 34 days.

(21) Appl. No.: 17/457,786

(22) Filed: Dec. 6, 2021

(65) Prior Publication Data
US 2023/0177293 A1     Jun. 8, 2023

(51) Int. Cl.
*G06K 7/14*     (2006.01)
*G06K 7/08*     (2006.01)

(52) U.S. Cl.
CPC .......... *G06K 7/1417* (2013.01); *G06K 7/089* (2013.01)

(58) Field of Classification Search
CPC .. G06K 7/1417; G06K 7/089; G06K 7/10722; G06K 7/10801
See application file for complete search history.

(56) References Cited

U.S. PATENT DOCUMENTS

| | | |
|---|---|---|
| 5,837,987 A | 11/1998 | Danielson et al. |
| 8,201,740 B2 | 6/2012 | Vinogradov et al. |
| 8,899,484 B2 | 12/2014 | Trajkovic et al. |
| 9,185,306 B1 | 11/2015 | Tan et al. |
| 9,646,188 B1 | 5/2017 | Kuchenbrod et al. |
| 9,800,749 B1 | 10/2017 | Tan et al. |
| 10,244,180 B2 | 3/2019 | Tan et al. |
| 10,268,854 B1 | 4/2019 | Tan et al. |
| 10,489,623 B1 | 11/2019 | Handshaw et al. |
| 10,803,272 B1 | 10/2020 | Deshmukh et al. |
| 11,245,845 B2 * | 2/2022 | Giordano ............... H04N 23/80 |
| 2002/0043561 A1 | 4/2002 | Tsikos et al. |
| 2002/0139853 A1 | 10/2002 | Tsikos et al. |
| 2007/0003105 A1 | 1/2007 | Nakamura et al. |

(Continued)

FOREIGN PATENT DOCUMENTS

JP     H09211127     8/1997

OTHER PUBLICATIONS

MC9300 Handheld Mobile Computer, Product Spec Sheet, ZIH Corp, (c) 2019.

(Continued)

*Primary Examiner* — Sonji N Johnson
(74) *Attorney, Agent, or Firm* — Cozen O'Connor

(57) ABSTRACT

An optical scanner device includes at least one image capture device and a transmitter of at least one aimer beam. The scanner device determines ranging to a subject using the at least one aimer beam projected to reflect off of a surface of the subject, and detects a position of the aimer-beam reflection within an image frame captured by the image-capture device, the position being a primary indicator of a distance to the subject from the optical scanner device. A secondary indicator of the distance to the subject within the image frame in combination with the first indicator is used to help detect the aimer beam reflection against noise and detect an occurrence of an optical misalignment with possible self-correction of calibration after such misalignment.

20 Claims, 16 Drawing Sheets

(56) References Cited

U.S. PATENT DOCUMENTS

| | | |
|---|---|---|
| 2007/0181692 A1 | 8/2007 | Barkan et al. |
| 2009/0084851 A1 | 4/2009 | Vinogradov et al. |
| 2011/0157373 A1 | 6/2011 | Ye et al. |
| 2015/0144699 A1* | 5/2015 | Sackett .............. G06K 7/10722 235/462.24 |
| 2017/0280028 A1 | 9/2017 | Tan et al. |
| 2017/0289451 A1 | 10/2017 | Wittenberg et al. |
| 2017/0343345 A1* | 11/2017 | Wittenberg ............ G01C 3/085 |
| 2018/0024974 A1 | 1/2018 | Welinder et al. |
| 2018/0124299 A1 | 5/2018 | Brook |
| 2019/0087618 A1 | 3/2019 | Lei et al. |
| 2019/0182413 A1 | 6/2019 | Tan et al. |
| 2019/0228195 A1 | 7/2019 | Lozano et al. |
| 2020/0320259 A1* | 10/2020 | Stagg ................... G06K 7/1413 |

OTHER PUBLICATIONS

Corrected Written Opinion, dated Jul. 29, 2021, for European Application No. 21157631.9, 2 pages.
Extended European Search Report, dated Jul. 9, 2021, for European Application No. 21157631.9, 5 pages.
DS36X8 Digital Scanner Product Reference Guide, MN-002689-13-EN, Revision A, , 618 Pages Sep. 2021.
European Search Report, dated Apr. 11, 2023, for EP 22211301.1, 5 pages.
Extended European Search Report issued in European Application No. 21212343.4, dated Apr. 19, 2022, 6 pages.

\* cited by examiner

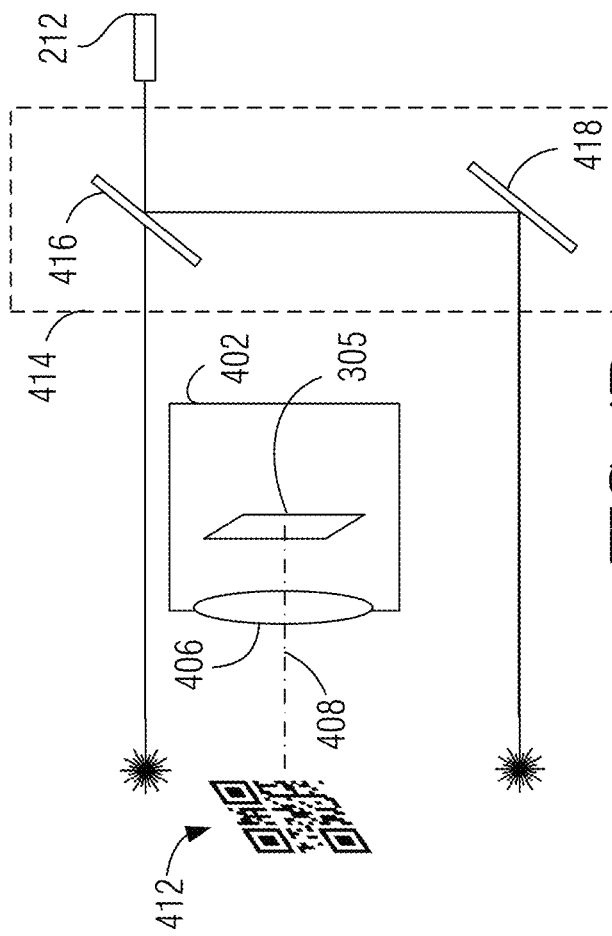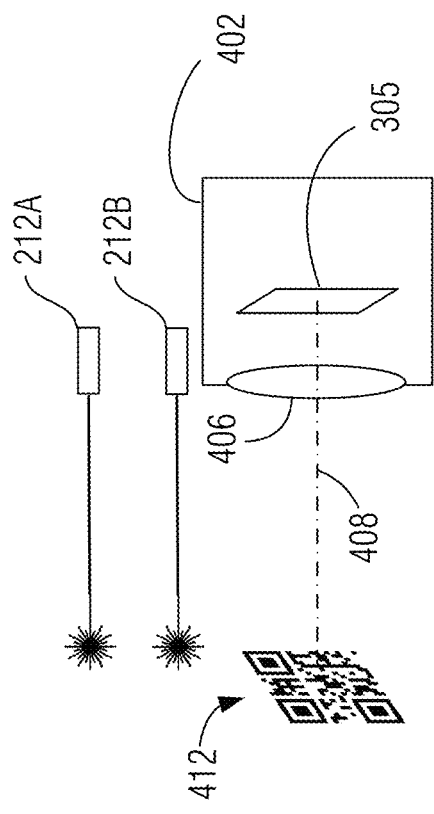
*FIG. 4C*
*FIG. 4D*

ROBUST OPTICAL AIMER FOR TRIANGULATION-BASED DISTANCE MEASUREMENT

CROSS-REFERENCE TO RELATED APPLICATION

This Application discloses subject matter related to U.S. application Ser. No. 17/118,374 filed Dec. 10, 2020, the content of which is incorporated by reference into the present disclosure.

TECHNICAL FIELD

The present disclosure generally relates to automated vision and, more particularly, to capturing and processing of images containing subject matter of interest such as machine-readable symbols or patterns.

BACKGROUND

Image-based optical scanning includes a diverse range of applications such as reading of machine-readable symbols (e.g., one-dimensional symbols, 2-dimensional symbols), optical character recognition, object detection or recognition, and the like. In general, such systems work by capturing a digital image of a subject using a camera with an image sensor, and computationally processing the captured image to autonomously detect, recognize, or read the subject. The output generally includes data represented by, or describing, the subject. For example, in the case of reading a 1-D or 2-D symbol, the output may be a number or an alphanumeric string represented by that symbol. Likewise, in the case of recognizing a printed or hand-written character or set of characters, the output may be a textual representation of that character or set; and in the case of object recognition, the output may be a classification result (e.g., a label) describing the object.

Optical scanners offer the versatility of being able to capture many different types of symbols and at different distances from the reader. State-of-the-art optical scanners may use multiple cameras with different fields of view to capture multiple images of the subject, and use image processing techniques to determine the best image for symbol reading. Such scanners may employ autofocus systems that focus the optics of a camera at the correct distance.

Autofocus techniques may be passive or active. Passive autofocus makes a complete focus sweep while evaluating the image contrast and deciding which focus setting produces the greatest contrast and is thus the best one to use. This approach is a type of closed-loop system that is reliable but slow, resulting in significant latency that adversely affects the responsiveness of the scanner device.

Active autofocus techniques can be significantly faster than passive autofocus techniques. Active autofocus uses an auxiliary measurement system that emits a signal which is not part of the image to be captured, and senses a reflection of the emitted signal from the target's surface. These include such technologies as time-of-flight sensors, triangulation, phase-shift measurement, and ultrasound measurement, among others. Active autofocus techniques provide some measure (such as turn-around delay, phase shift, or dot-displacement inside the received image, etc.) that can indicate the distance from the scanner to the target. In turn, the measured distance is used to set the correct focus position. Active autofocus systems are open-loop systems that may be fast, but their accuracy is dependent on the performance of the auxiliary measurement system. Likewise, the more accurately the open-loop relationship between the best focus distance and the corresponding best focusing system characteristic (e.g., focus position for lens actuators, voltage corresponding to a specific dioptric power for liquid lenses or piezoelectric-actuated lenses) can be modeled, the faster the system's focusing speed may be.

In optical-emission active autofocus systems, such as those using laser-spot projection, there may be challenges when operating in conditions that are not optimal (e.g., complex scenes with external lights, multiple reflective surfaces) that may confuse the image sensor and spot analysis. To make such active autofocus systems more robust, triangulation techniques have been proposed which rely on fixed mechanical properties of the system (e.g., multiple image sensors at a fixed distance from one another) to discriminate between correct and false spots.

These triangulation systems provide practical advantages, but may suffer from the possibility of misalignment errors and loss of calibration that may occur over time. For example, thermal or mechanical stresses may cause warping or other deformation of the frame or housing of the scanner device, or alignment of the optical components. Consequently, the autofocus system may fail to achieve a proper focus setting, or it may require more time to achieve a proper focus setting, either of which is undesirable. A practical solution is needed to address these, and other, challenges in autofocus systems.

SUMMARY

According to some aspects of this disclosure, an automatic system is operative to detect any mechanical misalignments in the image sensor(s) and aimer transmitter(s) that may occur after initial calibration in production. These misalignments can be related to strong mechanical shocks or extreme temperature variations during the life of the scanner device, resulting in deformation of the frame or enclosure, or optical components of the scanner. Such mechanical or thermal events may cause the system to stabilize in a state in which the aimer spot or pattern is different than the originally-manufactured position which, in turn, can degrade the performance of the triangulation operation that computes the distance from the projected aimer spot or pattern. These distance measurements that are used for lens focusing can be adversely impacted by a degradation in triangulation accuracy. Moreover, errors in aimer positioning within images can degrade performance even when those images are used for applications that are not based on distance estimation, such as pick-list decode.

An automatic compensation or recalibration system according to some embodiments can correct such detected problems. As one principle which may be utilized in some embodiments, a more-reliably-fixed first set of mechanical or optical characteristics of the system may be relied upon as a reference usable to achieve a correction or recalibration for misalignment of a second set of mechanical or optical characteristics which are less-reliably fixed. As described in greater detail below, in various embodiments, the more-reliably-fixed first set of mechanical or optical characteristics may include:

in implementations using multiple image-capture devices 102, one of the image-capture devices 102 and one of the aim transmitter may be integral with, or fixed to, a chassis or central axis of the scanner device and in a way that is more reliable in retaining its position when the scanner device subjected to mechanical or thermal stresses; or in implementations utilizing multiple aimer beams, the relative distance between the projected aimer spots or patterns from the multiple beams.

More generally, an apparatus of an optical scanner for scanning a subject according to some embodiments includes interface circuitry having an input to receive an at least one image from at least one image-capture device of the optical scanner, as well as controller circuitry coupled to the interface circuitry and the input. The controller circuitry is operative to process the at least one image to determine ranging between the optical scanner and the subject based on (a) at least one aimer beam projected by an aimer transmitter of the optical scanner to produce a corresponding at least one reflection off of a surface of the subject, and (b) detection of a position of the at least one aimer-beam reflection within the at least one image.

The position of the at least one aimer-beam reflection within the image is a primary indicator of a distance between the surface of the subject and the at least one image-capture device of the optical scanner. Further, the at least one image includes a secondary indicator of the distance between the surface of the object and the at least one image-capture device. The secondary indicator is used in combination with the first indicator to detect an occurrence of an optical misalignment of the optical scanner.

In another type of embodiment, the scanner device may be intrinsically designed and constructed such that any misalignments which may occur after initial fabrication or calibration are detectable. One such approach utilizes two or more divergent aimer beams that diverge at an angle that causes the beams to produce aimer spots or patterns at the same relative distance within the captured image frame, regardless of distance to the subject surface onto which the aimer spots or patterns are projected.

An apparatus of an optical scanner in accordance with this type of embodiment includes interface circuitry including an input to receive an at least one image from at least one image-capture device of the optical scanner, and controller circuitry coupled to the interface circuitry and the input. The controller circuitry is operative to process the at least one image to determine ranging between the optical scanner and the subject based on (a) projection of a pair of divergent aimer beams projected by an aimer transmitter system of the optical scanner to produce a corresponding pair of reflections off of a surface of the subject, and (b) detection of a position of at least one aimer-beam reflection of the pair of aimer-beam reflections within the at least one image.

The pair of divergent aimer beams are divergent such that the pair of reflections, as captured in the at least one image by the at least one image sensor, are separated from one another by the same separation distance within each captured image, regardless of the ranging. In addition, any change in the separation distance is indicative of an occurrence of an optical misalignment of the optical scanner.

In a related embodiment, a single aimer beam source is arranged with an optical system (e.g., beam splitter and reflector) to produce the multiple divergent beams. Advantageously, this arrangement is intrinsically more reliable since the optical system is less likely to fall out of alignment than two distinct aimer beam sources.

BRIEF DESCRIPTION OF THE DRAWINGS

FIGS. 4A-4D are simplified schematic diagrams that illustrate arrangements that may be employed as examples of one or more image-capture devices.

DETAILED DESCRIPTION

Figure 1:
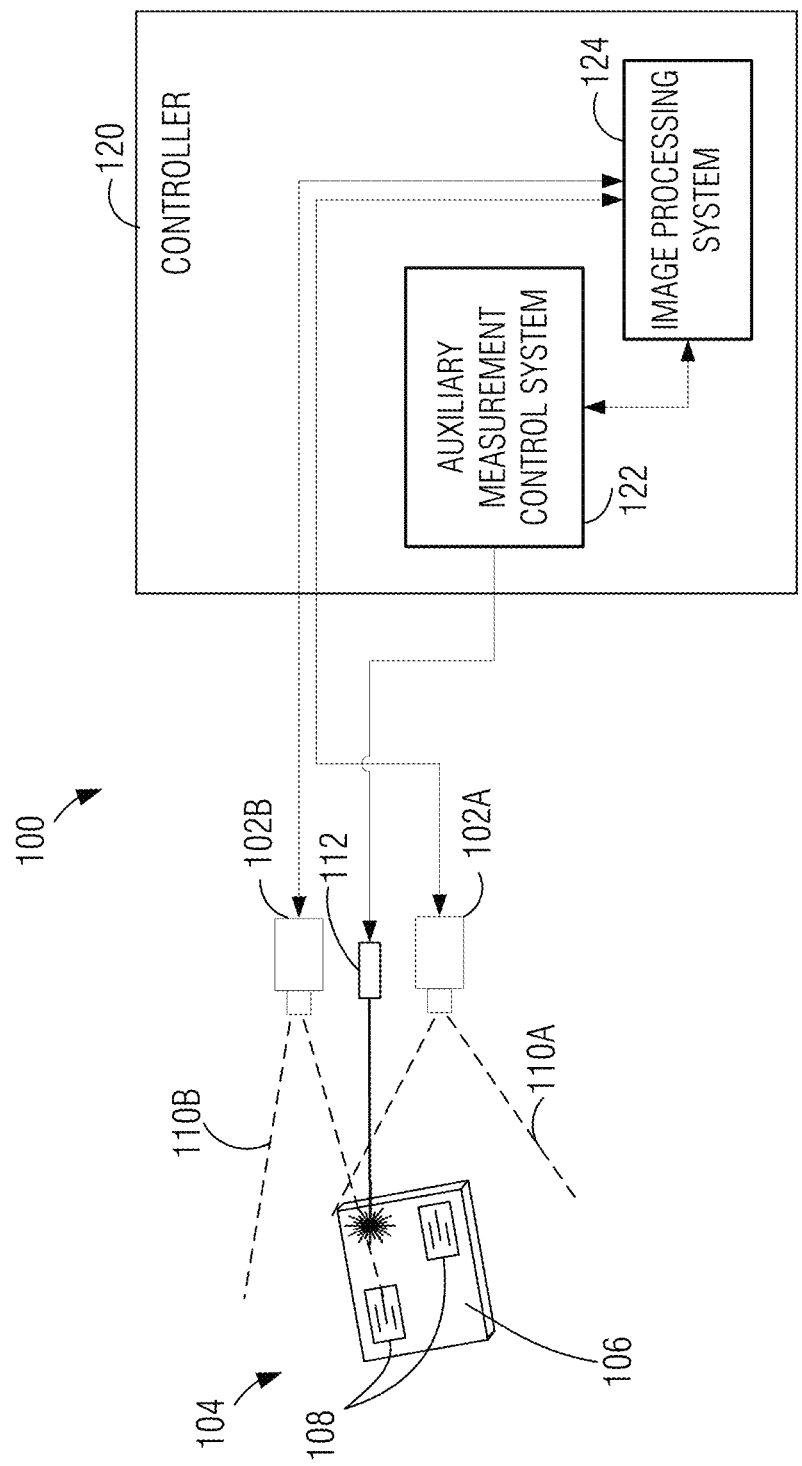
FIG. 1 is a simplified block diagram illustrating an implementation of a scanning system according to at least one example embodiment.

The illustrations included herewith are not meant to be actual views of any particular systems, memory device, architecture, or process, but are merely idealized representations that are employed to describe embodiments herein. Elements and features common between figures may retain the same numerical designation except that, for ease of following the description, for the most part, reference numerals begin with the number of the drawing on which the elements are introduced or most fully described. In addition, the elements illustrated in the figures are schematic in nature, and many details regarding the physical layout and construction of a memory array and/or all steps necessary to access data may not be described as they would be understood by those of ordinary skill in the art.

As used herein, the singular forms "a," "an," and "the" are intended to include the plural forms as well, unless the context clearly indicates otherwise.

As used herein, "or" includes any and all combinations of one or more of the associated listed items in both, the conjunctive and disjunctive senses. Any intended descriptions of the "exclusive-or" relationship will be specifically called out.

As used herein, the term "configured" refers to a structural arrangement such as size, shape, material composition, physical construction, logical construction (e.g., programming, operational parameter setting) or other operative arrangement of at least one structure and at least one apparatus facilitating the operation thereof in a defined way (e.g., to carry out a specific function or set of functions).

As used herein, the phrases "coupled to" or "coupled with" refer to structures operatively connected with each other, such as connected through a direct connection or through an indirect connection (e.g., via another structure or component).

Some aspects of the present disclosure provide an image-based optical scanning system having multiple image-capture devices. FIG. 1 is a simplified block diagram illustrating an implementation of a scanning system 100, according to at least one example. As discussed further below, the scanning system 100 may be employed to capture multiple images of a subject 104, such as a machine-readable symbol or set of symbols 108 (e.g., barcode, 2D barcode, image-encoded information such as a digital watermark, printed characters or text), or a machine-detectable or -recognizable object 106. Scanning system 100 may read, recognize, detect, or perform other automated analytical processing of the subject. For the sake of brevity, operations such as these will be referred to in the present context as "reading".

Aspects of the disclosure may likewise be used in other areas of automated vision, such as automated guided vehicles (AGVs), robotics, automated driving, and machine-vision (MV) systems. The embodiments described below are in the context of visual symbol-reading, but principles of the present technologies relating to ranging and calibration are likewise applicable in a multitude of other areas.

Scanning system 100 includes one or more image-capture devices. In the depicted example, system 100 includes two image-capture devices 102A-102B (collectively, image-capture devices 102). It will be understood that related embodiments may have just one image-capture device, or three or more image-capture devices. Each image-capture device 102 may include an image sensor that is constructed and operative to produce signals representing images or video frames. In the present context, the terms "image" and "video frame" may be used interchangeably to refer to a fixed image or portion thereof, with any distinctions intended between the two data types specifically called out if pertinent.

Each image-capture device 102 may be assembled together with optical components, such as an objective, microlens array, or the like. In other examples, more than one individual image-capture device may share a common optical system. Image-capture devices 102A-102B may be constructed using any suitable technology, whether known or arising in the future. Without limitation, some examples include complementary metal-oxide semiconductor (CMOS)-based sensors, charge-coupled device (CCD)-based sensors, sensors optimized for the visible spectrum, sensors optimized for infrared or near-infrared frequencies, high-dynamic-range (HDR) sensors, monochrome sensors, color sensors, Quanta Image Sensors, Hyperspectral sensors, Polarized sensors, Image sensors embedding AI capabilities, or the like. In related implementations, the set of image-capture devices 102 that are employed in scanning system 100 include sensors of diverse types, such as a grouping that includes conventional image sensor and a HDR image sensor, for example.

As shown in the example of FIG. 1, image-capture devices 102A-102B have respective fields of view 110A-110B. In related examples, the various image-capture devices 102 have different optical characteristics. For instance, image-capture device 102A may be a near-field camera, whereas image-capture device 102B may be a far-field camera. In other examples, the image-capture devices 102 have the same optical characteristics. As another useful feature in some embodiments, the image-capture devices 102 are situated in a specific spaced relationship with one another.

Scanning system 100 further includes one or more aimer transmitters. In the example depicted, a single aimer transmitter 112 is shown, which may be a laser emitter, a light source with a lens system for shaping the emitted beam, or the like. It will be understood that in other embodiments, multiple aimer transmitters may be employed. A configuration where multiple aimer transmitters 112 may be appropriate is in a system with only one image sensor. In the example as shown, aimer transmitter 112 is situated at a fixed position relative to image-capture devices 102A-102B. As will be discussed in greater detail below, in some embodiments, the positional offset between each image-capture device 102 and aimer transmitter 112 facilitates determination of ranging to the target surface using a triangulation technique.

Image-capture devices 102 and aimer transmitter 112 are interfaced with controller 120, which includes auxiliary measurement control system circuitry 122 and image processing system circuitry 124. In some embodiments, each image-capture device 102 and aimer transmitter 112 may be communicatively coupled to controller 120 through a wired or wireless medium. In a related embodiment, a network (e.g., LAN, WAN, PAN, Internet) may facilitate the communicative coupling. In some embodiments, the image-capture device 102 may be connected directly to controller 120 through a suitable local interface (e.g., I²C, USB, SPI, UART, I³C) or may be integrated with controller 120 and interconnected using an internal interconnect such as a suitable variant of a peripheral component interconnect (PCI), serial AT Attachment (SATA), mobile industry processor interface (MIPI), or other interconnects known by those skilled in the art.

Auxiliary measurement control system 122 is operative in concert with image processing system 124 to coordinate the operation of aimer transmitter 112 and image-capture devices 102A-102B to measure the ranging to a target surface of subject 104. Image-capture devices 102 are communicatively coupled to image processing system 124, which is configured to receive the captured images and perform the processing operations for determining the ranging, setting operational parameters to facilitate image capture of subject 104 based on the ranging, and capture the images of subject 104 to perform reading of subject 104.

For determining the ranging, image processing system 124 is coupled to auxiliary measurement control system 122 so that the two may exchange relevant data and commands. For instance, image sensor frame capture signaling may be supplied by image processing system 124 to auxiliary measurement control system 122, so that the latter may adjust the activation of the aimer transmitter's patter (e.g., spot, line, cross, triangle or other shape) within frames of the captured images.

Figure 2:
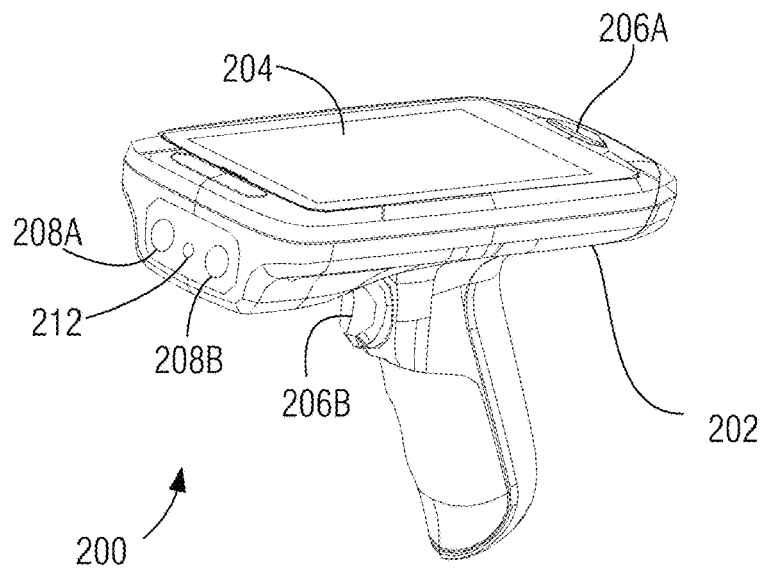
FIG. 2 is a diagram illustrating handheld reader as one example implementation of a scanning system.

FIG. 2 is a diagram illustrating handheld reader 200 as one example implementation of scanning system 100. Handheld reader 200 includes housing 202, display 204, and pushbutton controls 206A and 206B. As depicted, handheld reader 200 also includes forward-facing cameras 208A and 208B positioned in a spaced-apart relationship so as to have partially overlapping fields of view. A forward-facing aimer transmitter 212 is provided to facilitate ranging to the subject. Aimer transmitter 212 may work in concert with one or all of the cameras 208A, 208B according to a triangulation technique in which a position of the aimer spot within the field of view of one or both of the cameras is indicative of the distance to the subject. The ranging measurements may be used as input (among other inputs) to determine operational parameters such as selection of image sensor for subsequent information processing, focus setting, illumination power, and other settings.

According to other embodiments, a reader may be mounted to a stationary or mobile structure. Examples of mounting locations for various scanning applications include vehicles, doorways, ramps, conveyors, buildings, robots, or the like. In mounted implementations, the cameras may have their own respective housings, which may be separate from the image processing system hardware.

Figure 3:
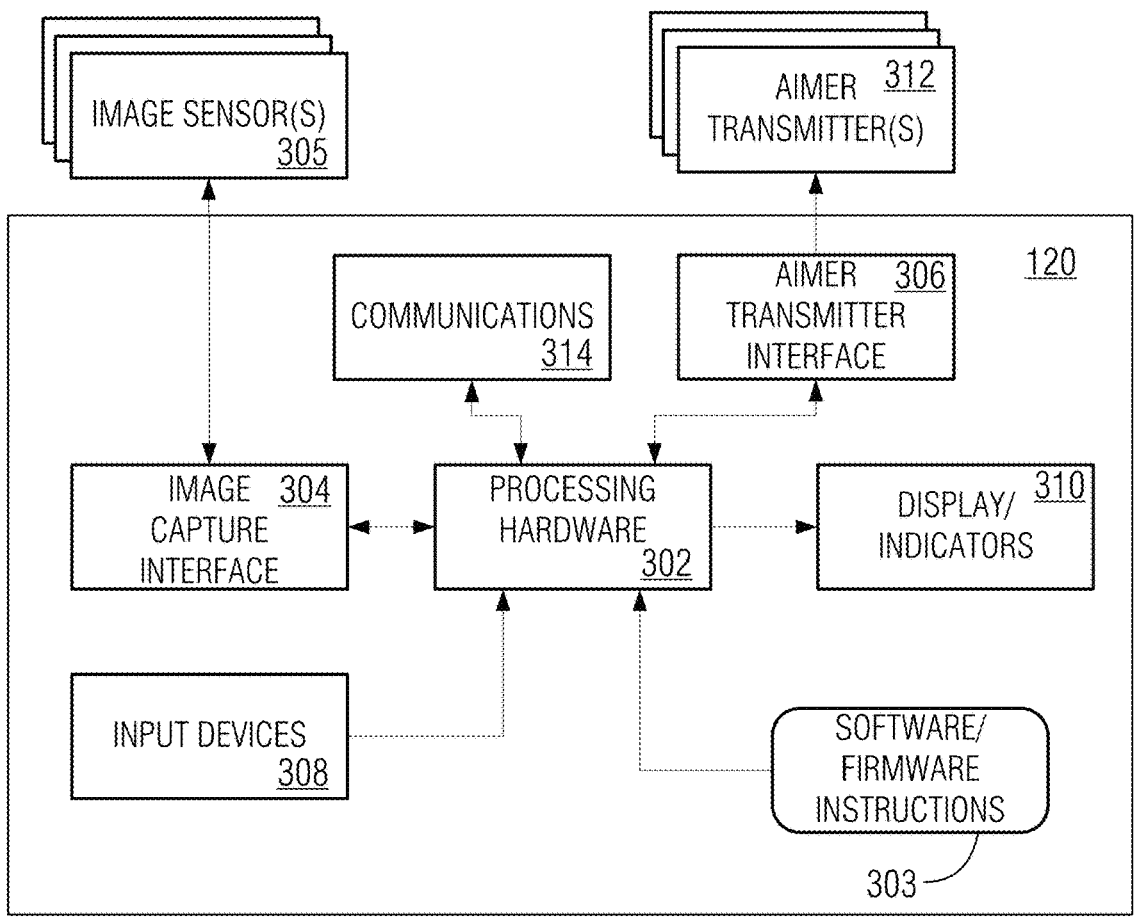
FIG. 3 is a high-level block diagram illustrating an example system architecture of a scanning system 100 according to some embodiments.

FIG. 3 is a high-level block diagram illustrating an example system architecture of scanning system 100, with various components of controller 120 shown. Controller 120 includes processing hardware 302 operatively coupled to image capture interface 304, input devices 308, display or indicators 310, communications circuitry 314, and aimer transmitter interface 306. Processing hardware 302 includes one or more processor circuits that execute software or firmware instructions 303, with the latter being stored in a non-transitory machine-readable medium such as a read-only memory, flash memory, random-access memory, or the like.

Controller 120 includes various engines, each of which is configured to carry out a function or set of functions, as detailed below. The term "engine" as used herein means a tangible device, component, or arrangement of components implemented using hardware, such as by an application specific integrated circuit (ASIC) or field-programmable gate array (FPGA), Complex Programmable Logic Device (CPLD), for example, or as a combination of hardware and software, such as by a processor-based computing platform and a set of program instructions that transform the computing platform into a special-purpose device to implement the particular functionality. An engine may also be implemented as a combination of the two, with certain functions facilitated by hardware alone, and other functions facilitated by a combination of hardware and software.

In an example, the software may reside in executable or non-executable form on a tangible machine-readable storage medium. Software residing in non-executable form may be compiled, translated, or otherwise converted to an executable form prior to, or during, runtime. In an example, the software, when executed by the underlying hardware of the engine, causes the hardware to perform the specified operations. Accordingly, an engine is specifically configured (e.g., hardwired), or temporarily configured (e.g., programmed) to operate in a specified manner or to perform part or all of any operations described herein in connection with that engine.

In examples in which engines are temporarily configured, each of the engines may be instantiated at different moments in time. For example, where the engines comprise a general-purpose hardware processor core configured using software; the general-purpose hardware processor core may be configured as respective different engines at different times. Software may accordingly configure a hardware processor core, for example, to constitute a particular engine at one instance of time and to constitute a different engine at a different instance of time.

In certain implementations, at least a portion, and in some cases, all, of an engine may be executed on the processor(s) of one or more computers that execute an operating system, system programs, and application programs, while also implementing the engine using multitasking, multithreading, distributed (e.g., cluster, peer-peer, cloud, etc.) processing where appropriate, or other such techniques. Accordingly, each engine may be realized in a variety of suitable configurations, and should generally not be limited to any particular implementation exemplified herein, unless such limitations are expressly called out.

In addition, an engine may itself be composed of more than one sub-engines, each of which may be regarded as an engine in its own right. Moreover, in the embodiments described herein, each of the various engines corresponds to a defined functionality; however, it should be understood that in other contemplated embodiments, each functionality may be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Image capture interface 304 includes circuitry facilitating the exchange of data between processing hardware 302 and one or more image sensor(s) 305. In some examples, image capture interface 304 includes data buffers, video decoders, video encoders, address and data bus interfaces, serial data receiver/transmitter circuitry, analog-to-digital (A/D) converter circuitry, and the like. The data communications portions of image capture interface 304 may facilitate wired or wireless communication. Image capture interface 304 is operative to pass video frames from their original format as output by each of image sensors 305 to processing hardware 302 in a suitable data format to be read by processing hardware 302. Image capture interface 304 and processing hardware 302 may work in concert to implement image processing system 124 (FIG. 1).

In a related example, image capture interface 304 may additionally be configured to pass information from processing hardware 302 to one or more of image sensors 305. This upstream information may include configuration commands such as sensor gain settings, frame rate, exposure control, activation/deactivation commands, etc.

In some embodiments, image capture interface 304 may be integrated as part of a digital signal processor (DSP) device or microcontroller device. In other embodiments, image capture interface 304 may be integrated as part of one or more image sensors 305.

Aimer transmitter interface 306 includes circuitry to control the operation of one or more aimer transmitter(s) 312. Aimer interface 306 may include current regulator circuitry, switching circuitry, or the like. Each aimer transmitter 312 may include a solid-state laser emitter having a wavelength that is within the light-detection range of image sensors 305.

In other implementations, each aimer transmitter 312 may include another type of light source, e.g., visible or infrared diode and a lens system to shape the emitted light into a spot or other pattern to be projected onto the target surface. Aimer transmitter interface 306, and processing hardware 302 may work in concert to implement auxiliary measurement control system 122 (FIG. 1).

Input devices 308 include user-operable controls, such as pushbuttons, keypad, touchscreen, and the like, as well as additional sensors, such as a ranging sensor, motion sensor, accelerometer, etc. Display or indicators 310 include devices such as a liquid-crystal display (LCD), LED indicators, speaker or buzzer, and other suitable output devices.

Communications circuitry 314 includes wired or wireless communications facilities that provide input and output to and from processing hardware 302. Communication circuitry may include one or more of the following types of communication circuits: universal serial bus (USB), CAN, $I^2C$, SPI, UART, $I^3C$, Ethernet, personal-area network such as Bluetooth according to an IEEE 802.15 standard, Wi-Fi according to an IEEE 802.11 standard, or the like.

Figure 4B:
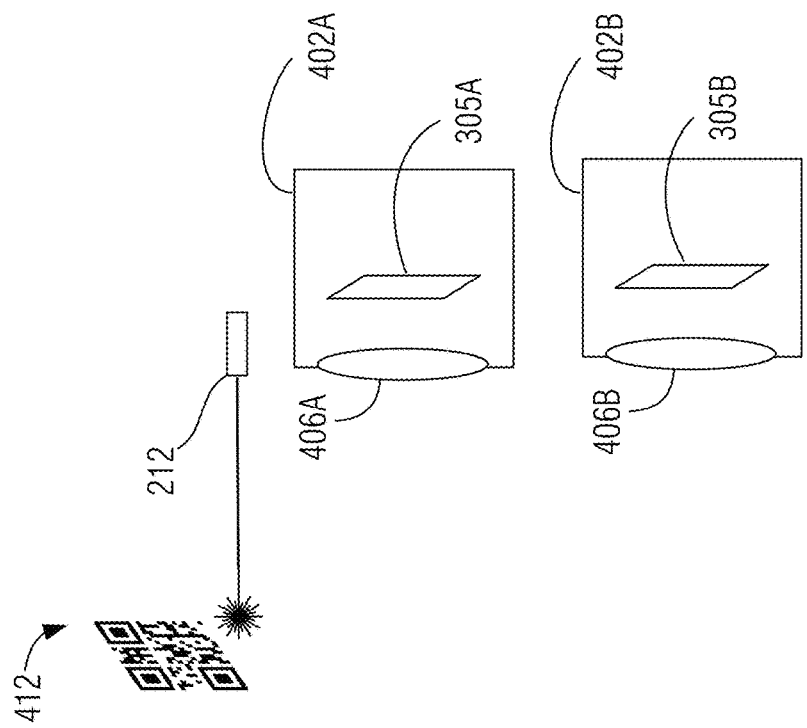
Figure 4A:
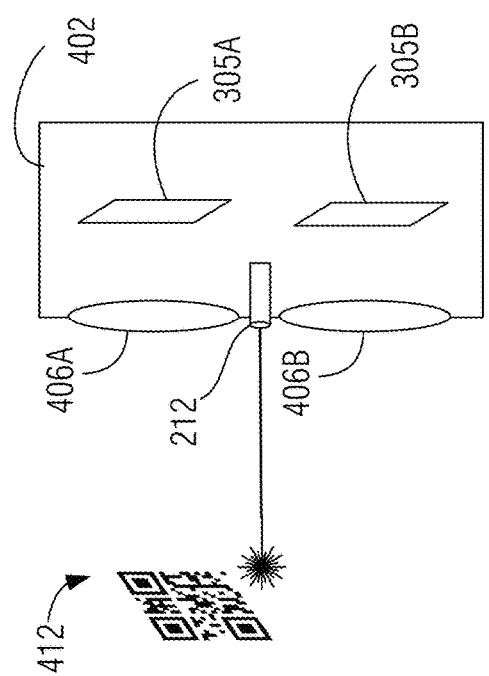

FIGS. 4A-4D are simplified schematic diagrams that illustrate arrangements that may be employed as examples of one or more image-capture devices such as image-capture devices 102. FIG. 4A illustrates an example arrangement consistent with handheld reader 200 described above with reference to FIG. 2. A single enclosure 402 houses image sensors 305A and 305B, each arranged with a corresponding objective 406A and 406B. Aimer transmitter 212 is also shown. As described above, aimer transmitter 212 may be used to place a spot on a surface containing subject 412, and video frames captured by image sensors 305A and 305B may be evaluated to determine the ranging to subject 412. FIG. 4B illustrates an example with separate enclosures, 402A and 402B, each having a corresponding image sensor 305A, 305B and objective 406A, 406B. Aimer transmitter 212 may be situated independently from either enclosure 402A or 402B, or it may be situated in one of the enclosures 402A or 402B.

FIGS. 4C and 4D illustrate another set of examples in which a single image sensor 305 is provided in enclosure 402 and arranged with single objective 406. To facilitate triangulation with these single-image-sensor arrangements, multiple aimer spots are utilized. In the example of FIG. 4C, a first aimer transmitter 212A and a second aimer transmitter 212B are arranged in a spaced-apart relationship with respect to one another, and with respect to image sensor 305. In the example of FIG. 4D, a single aimer transmitter 212 is provided. To achieve multiple spots or other pattern(s), optical system 414 is provided. In one example, as shown, optical system 414 includes beam splitter 416 and mirror 418.

In some embodiments of the arrangements of FIGS. 4C and 4D, as depicted, each aimer beam may be situated at a different distance from the centerline of image sensor 305. In related embodiments, the aimer beams are parallel.

In still other embodiments, the aimer beams are not parallel. For example, they may be arranged to diverge from one another with increasing distance from image sensor 305. In one type of embodiment, the aimer beams are arranged to diverge at an angle such that the aimer spots maintain the same distance from one another as captured in the images by image sensor 305, regardless of distance.

Figure 5:
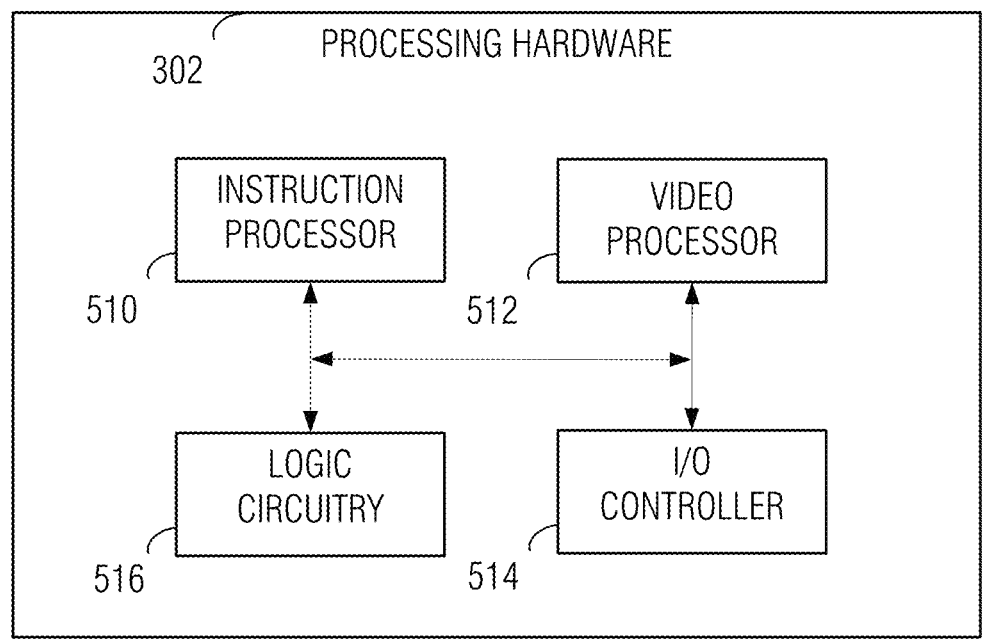
FIG. 5 is a simplified block diagram illustrating a portion of processing hardware of a controller 120 according to one example.

FIG. 5 is a simplified block diagram illustrating a portion of processing hardware 302 of controller 120 according to one example. Processing hardware 302 includes instruction processor 510, video processor 512, and input/output (I/O) controller 514. Instruction processor 510 is constructed to execute software or firmware instructions 303, the execution of which causes instruction processor 510 to implement engines to carry out the overall functionality of scanning system 100 in conjunction with the other components of controller 120, image sensors 305, and aimer transmitter 312 as shown in FIG. 3. For instance, instruction processor 510 may reads input devices 308 and take actions in response to those inputs; instruction processor 510 may write output to display or indicators 310; and instruction processor 510 may exchange data with communications circuitry 314 to send and receive data to or from other devices. In addition, instructions 303, when executed by instruction processor 510, may causes instruction processor 510 to carry out triangulation and calibration operations to determine ranging to the subject as described in greater detail below in accordance with some embodiments.

Instruction processor 510 may be of any suitable architecture. As an example, instruction processor 510 may include a central processing unit (CPU) core, RAM, non-volatile memory, memory controllers, address and data (or shared) busses, serial communications ports such a universal synchronous receiver/transmitter (UART), and peripheral circuitry such as timers, event counters, A/D or D/A converters, pulse-width modulation (PWM) generator, etc.

Video processor 512 is interfaced with instruction processor 510, and implements engines to receive captured images from image-capture devices 102, and to resample, crop, compress, or combine portions of images, filter, evaluate visual characteristics of the captured images, determine the location of captured visual elements within the image frame (such as the location of the aimer spot produced by aimer transmitter 212), and perform symbol reading or object detection algorithms. In some embodiments, video processor 512 includes a digital signal processor (DSP) core having a computing architecture that is optimized for video processing and including additional or specialized arithmetic logic units (ALUs)—direct-memory access, fixed-point arithmetic, etc., ASIC, FPGA, CPLD, or combination thereof.

I/O controller 514 includes circuitry that facilitates addressing, data transfer, memory access, and other interactions between instruction processor 510, video processor 512, and the other components of controller 120. As examples, I/O controller 514 may include a bus or system interconnect controller, a serial communications hub controller, or the like.

In related embodiments, instruction processor 510 and video processor 512 are integrated as a single processing device, such as a digital signal controller (DSC) that is configured to perform the respective functionality of instruction processor 510 and video processor 512 described above. Similarly, I/O controller 514 may also be integrated as part of a DSC implementation. In other related embodiments, some portion of processing hardware 302 may be implemented with logic circuitry 516, such as an application-specific integrated circuit (ASIC), FPGA, CPLD, hardware coprocessor, or the like. Logic circuitry 516 may be utilized to perform certain operations with greater speed or power efficiency than can be conventionally achieved using an instruction processor, such as image filtering, image frame combining, triangulation, or the like.

Figure 6:
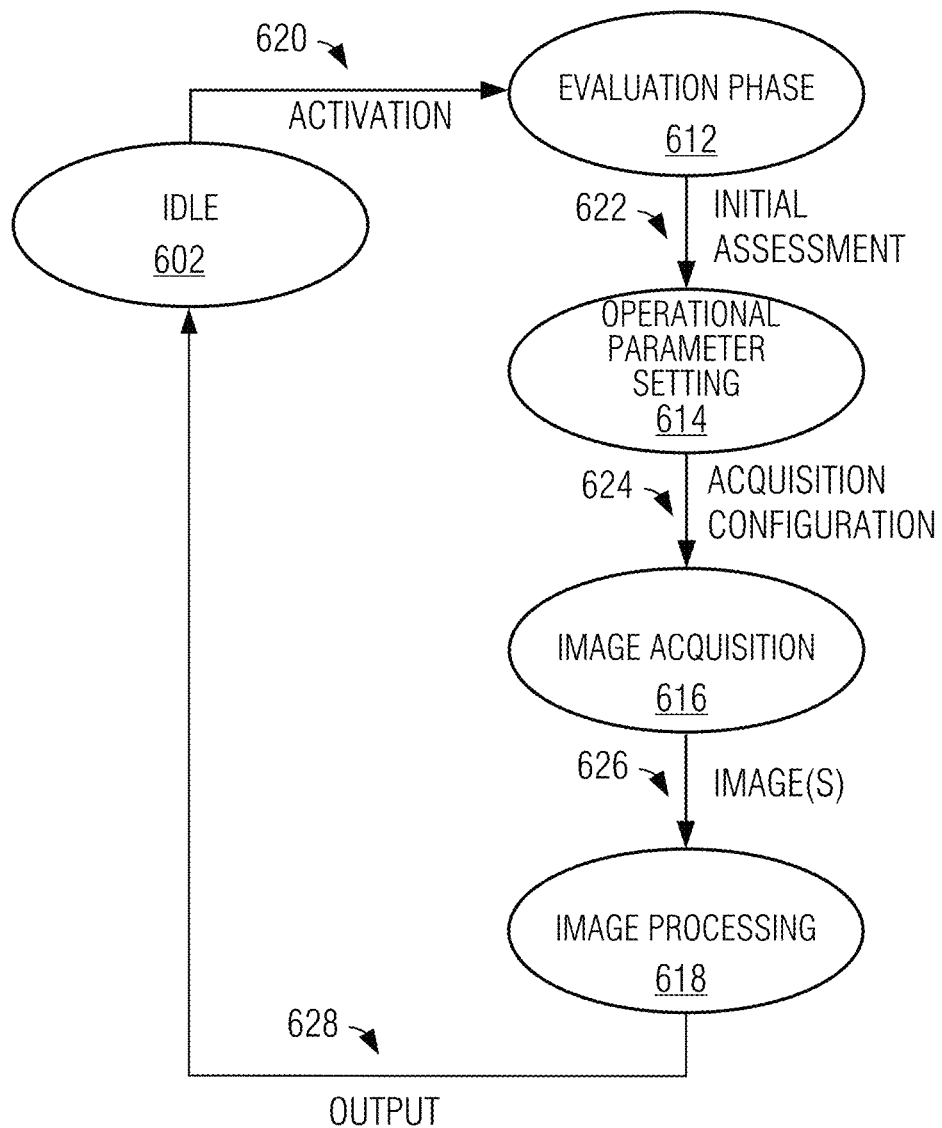
FIG. 6 is a high-level state diagram illustrating a simplified operational regime of a controller of a scanning system according to an example embodiment.

FIG. 6 is a high-level state diagram illustrating a simplified operational regime of controller 120 according to an example embodiment. The states include idle 602, evaluation phase 612, operational parameter setting 614, image acquisition 616, and image processing 618. Evaluation phase 612 is started in response to an activation event 620. In the example of a hand-triggered reader such as handheld reader 200, the activation event may be actuation of a pushbutton.

Evaluation phase 612 involves rapidly performing one or more initial measurements, such as a distance measurement, lighting conditions measurement, or other such measurement, in order to determine the mode of operation for image acquisition. In the case of distance measurement, the ranging to the subject may be determined using aimer transmitter 112 and auxiliary measurement control system 122 and image processing system 124 to produce a ranging measurement as part of initial assessment data 622. In some embodiments, the speed of evaluation phase 612 is maximized to provide minimal operational latency. As an example, evaluation phase 612 may be performed using a subset of the image frames in order to reduce the extent of image processing required to achieve initial assessment 622.

Operational parameter setting 614 uses the initial assessment data 622 to set operational parameters such as selection of camera or image sensor, focus setting, exposure setting, image-sensor gain setting, active illumination (e.g., flash or light) setting, active illumination source selection (in embodiments utilizing multiple active illumination sources), or the like. Operational parameter setting 614 produces acquisition configuration data 624, which may include a command set the focus, activate a flash or light, select of a region of interest (ROI), or any combination of these and other available settings. Image acquisition 616 involves activating or reading the selected image sensor according to the applicable operational parameters to capture one or a series of images 626. For example, the best image sensor may be selected, along with various settings for that image sensor, such as gain, exposure, etc.

Image processing 618 is generally performed on one or more captured images 626 resulting from operation of acquisition phase 616. Image processing operations 618 include reading of the subject (e.g., symbol reading, text recognition, object detection, object recognition, etc.). Image processing 618 is a more computationally-expensive process than the initial assessment operations that are performed as part of evaluation phase 612 and image acquisition phase 616. The result of image processing 618 is output 628, which may be in the form of a data object indicating the data of a machine-readable symbol, recognized text or object, etc.

Figure 7:
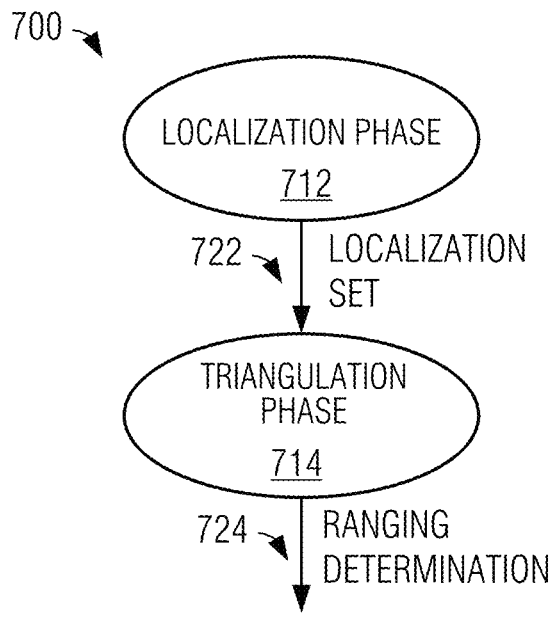
FIG. 7 is a state diagram illustrating autofocus operation according to some embodiments.

FIG. 7 is a state diagram illustrating autofocus operation 700, which may be considered a part of evaluation phase 612 according to some embodiments. Autofocus operation 700 includes localization phase 712 and triangulation phase 714. Localization phase 712 and triangulation phase 714 are each carried out by auxiliary measurement control system 122, which uses aimer transmitter 112 (such as aimer transmitter 212) and image processing system 124. In particular, aimer transmitter 112 may place a spot on a target surface of the subject. The aimer spot is sensed by the image sensor of each image capture device 102A, 102B, and the resulting images are processed rapidly to determine the ranging. Localization phase 712 determines a localization set 722 of possible coordinates of the aimer spot appearing in the images captured by each image capture device 102A, 102B. Using the localization set 722, the triangulation phase 714 makes a ranging determination. As described in greater detail below, one aspect of localization phase 712 includes modulation of the aimer spot, which helps controller 120 distinguish the aimer spot from interference, such as other sources of light or reflections, which may be present in the captured images. One aspect of triangulation phase 714 is a cross-checking operation that determines whether the locations of the aimer spot within the images, as captured by different image capture devices 102A, 102B, are plausible considering that the positional offsets of each type of image-capture device for various distances to the target surface are known in advance. Thus, the cross-checking operation may further help to improve the accuracy and computational performance of the ranging determination by discarding erroneous aimer spot locations.

Figure 8:
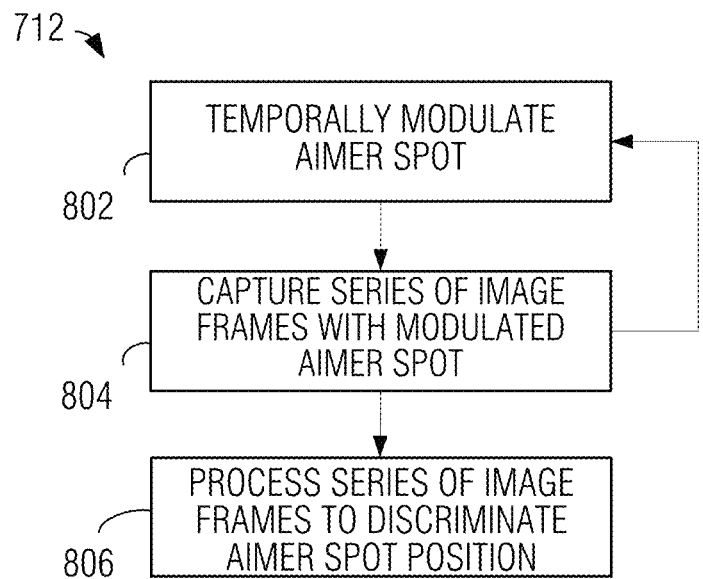
FIG. 8 is a process flow diagram illustrating an example sequence of operations corresponding to a localization phase of an autofocus operation according to some embodiments.

FIG. 8 is a process flow diagram illustrating an example sequence of operations corresponding to localization phase 712 according to some embodiments. At 802, aimer transmitter 112 is operated under the control of auxiliary measurement control system 122 such that the aimer spot as seen by image-capture devices 102A and 102B is temporally modulated. In the present context, temporal modulation of the aimer spot means that the aimer spot is varied over time such that the aimer spot's appearance differs among captured image frames. One or more of a variety of types of temporal modulation may be used, whether individually, or in a combination. Some examples of types of temporal modulation are described herein, but these examples does not constitute a complete or exhaustive set of temporal modulation types that may be used in various embodiments.

At 804, image capture devices 102A and 102B are operated by auxiliary measurement control system 122 working in concert with image processing system 124 to each capture a series of image frames with the aimer spot. Each image sensor's captured series of image frames, when viewed or analyzed in sequence, has the modulation pattern of the captured aimer spot. In related embodiments, the frame rate of each of the image-capture devices 102, relative to the rate of modulation of the capturable aimer spot is such that the modulation pattern is discernable from random visible noise or from other patterns of change that may be appearing in the series of image frames, such as a flickering light or reflection, for instance. At 806, auxiliary measurement control system working in concert with processing system processes each sensor's series of image frames, based on the captured aimer spot's modulation pattern, to discriminate the position of the aimer spot from other sources of light or reflection that may have also been captured in the series of image frames.

In a related embodiment, the capture is performed using only a portion of each image sensor, such as a strip of pixels having a predefined height (in pixels) that is less than the height of the corresponding image sensor. The y position of the strip may be in the center of the image frame, or it may be offset to be located in a region along the height of the image frame where the aimer spot is expected. In these embodiments, using only a portion of the image sensor facilitates faster processing since there is less visual information to be processed in each captured portion.

Modulation of the aimer spot of operation 802 may be achieved in a number of ways according to various embodiments. In one type of embodiment, the aimer transmitter may be switched on and off according to a particular pattern. The switching pattern may be at a particular frequency. In addition, the switching pattern may have a particular duty cycle, (i.e., on for a specific first duration and off for a specific second duration). The switching pattern may be encoded using on-off keying, frequency-shift keying, pulse-position modulation, phase shift keying, or other digital encoding technique that facilitates carrying of information by the modulation of the carrier spot. The information that may be encoded includes a numeric value, for instance.

In a related embodiment, the intensity of the aimer transmitter may be varied. Accordingly, the aimer spot may appear brighter or darker in successive images, and the variation of intensity may be implemented with a certain pattern. Likewise, an amplitude-shift keying, phase-shift keying technique, frequency-shift keying, or other encoding technique may be utilized with the varying intensity modulation.

Figure 9A:
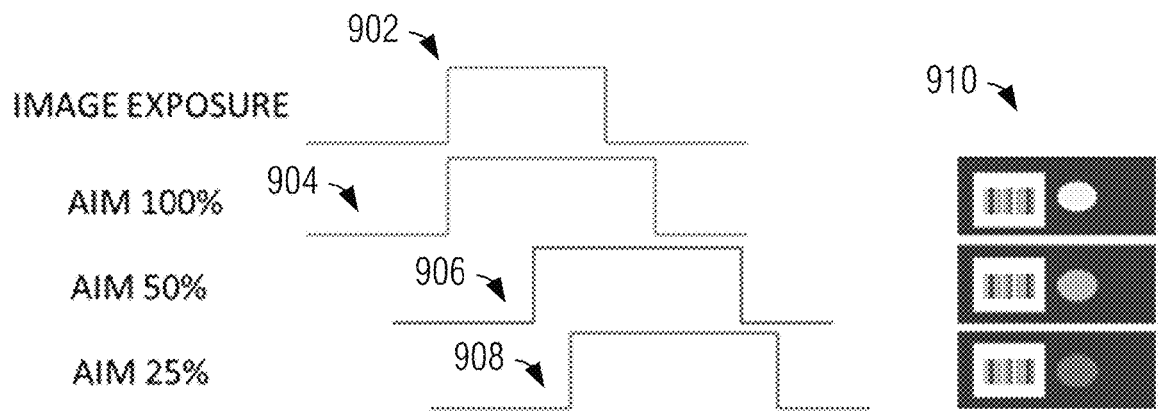
FIG. 9A is a diagram illustrating a technique of intensity variation of an aimer spot according to some embodiments.

In a related embodiment, the intensity of the captured aimer spot may be modulated by controlling the timing of the aimer transmission relative to the image-frame capture timing. FIG. 9A is a diagram illustrating an example of this type of embodiment. The image capture timing is indicated as image exposure 902, and various aimer activations are indicated at 904-908. Examples of the various levels of brightness of the resulting image spots is represented at 910. Aimer activation 904 is on for the entire duration of image exposure 902 to produce a full-intensity captured aimer spot. Aimer activation 906 is on for half of the image exposure 902 duration to produce 50% captured intensity as shown. Aimer activation 908 is on for one quarter of the image exposure 902 to produce a captured aimer spot intensity of 25% as shown. The percentages given in this example, are merely illustrative. Various other ratios of activation duration of the aimer transmitter may be used in various embodiments. This method of aimer spot intensity variation may likewise be used to encode information on the captured aimer spot.

Figure 9B:
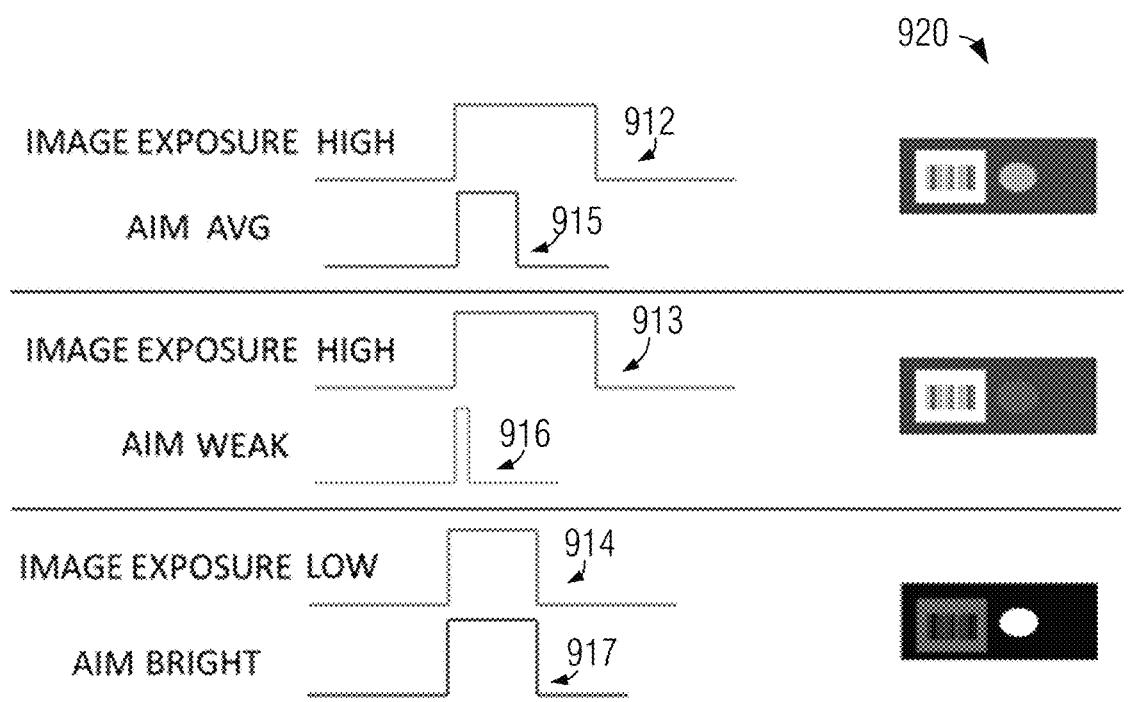
FIG. 9B is a diagram illustrating image-exposure and aimer-spot timings as an example of another type of embodiment in which the captured aimer spot may be modulated by controlling the pulse duration of the aimer transmission during the image-frame capture timing while the frame exposure time may be varied.

In a related embodiment, the intensity of the captured aimer spot may be modulated by controlling the pulse duration of the aimer transmission during the image-frame capture timing while the frame exposure time may be varied. This approach provides different overall brightness levels in the acquired images, which may facilitate the process of distinguishing the aimer spot from other light sources in the field of view. FIG. 9B is a diagram illustrating image-exposure and aimer-spot timings as an example of such an implementation. The capture timing of the three images is indicated as image exposure timings 912, 913, and 914. The varying aimer activation timings are indicated at 915-917.

In first frame, the image exposure 912 is of a relatively long duration, while the aimer activation 915 is a pulse of an intermediate duration falling within the duration of image exposure 912. This produces an intermediate-intensity captured aimer spot. In second frame, the image exposure 913 is of a relatively long duration that might also be equal to 912, while the aimer activation 916 is a pulse of short duration falling within the image exposure 913. This produces a lower intensity of captured aimer spot while having the similar or same ambient light exposure, in the case of the first frame. In the third frame, the image exposure 914 is reduced relative to image exposures 912 and 913, while the aimer activation 917 has a long pulse duration during image exposure 914. This combination produces a high captured aimer spot intensity, while having less undesired ambient light acquired by the sensor.

The technique as illustrated in FIG. 9B allows the aimer spot to be more easily isolated from any reflected light sources because the ambient light is following a partially opposite brightness modulation with respect to the aimer: namely, the aimer brightness becomes weaker as between exposures 912 and 913, while the overall brightness is the same so to detect the modulation that should come only from aim spot. Then, from image exposures 913 to 914 the aimer spot is brighter when ambient image as captured is darker, so to enhance the aimer spot detection. Thus, it becomes easier to distinguish the aimer spot from any noise originating from ambient light. This technique of aimer spot intensity variation may likewise be used to encode information on the captured aimer spot. Examples of the various levels of brightness of the resulting image spots is represented at 920.

The above-described modulation techniques may be used in any suitable combination. For example, on-off keying may be combined with aimer received intensity variation using image capture frame timing so that a certain pattern of on-off switched aimer spots may be captured at one intensity level, and another pattern of on-off switched aimer spots may be captured at another intensity level. In addition to the above-described modulation techniques, other modulation techniques may likewise be used (individually, or in some combination with others).

In another type embodiment, the exposure time or sensor gain may be varied to correspondingly vary the signal-to-noise ratio of the captured aimer spot (i.e., the signal) to other light sources or ambient light (i.e., the noise) appearing in the captured series of image frames. This technique may be used in combination with any of the modulation techniques discussed above.

Processing of the series of image frames to discriminate the aimer spot position in operation 806 may be performed in a variety of ways according to various embodiments. In one example, successive image frames in which the aimer spot is varied from frame to frame may be processed such that the pixel values of one frame are subtracted from the next, resulting in a difference frame representing a difference between the corresponding pixel values among the compared image frames. In the difference frame, the modulated aimer spot may appear as the greatest difference value.

A more advanced approach when using exposure and aimer modulation as described above with reference to FIG. 9B according to some embodiments involves comparing the first image with the second image to see if the difference in pixel value corresponds with the aimer-spot modulation. For example if pixel intensity in first image is higher than the corresponding pixel value in the second image multiplied by 1.5 for instance, then that pixel may be stored with a value of 0 in a "non-aimer pixels" synthetic image generated during a first processing step; then, similarly, if the third image has a pixel value higher than the corresponding second image pixel value multiplied by 2 for instance, that pixel may be also stored with a value of 0 in the "non-aimer pixel" synthetic image in this second processing step. If the third image has a pixel value that is lower than the "non-aimer pixels" image, than that pixel may be stored as zero in an "enhanced contrast aimer pixels" reference image generated in this processing step; otherwise it may be stored as a difference between the third image's pixel and the "non-aimer pixels" synthetic image.

In this example, since the third frame is the one with the lowest exposure (hence, ideally with lowest overall pixel value except for the pixels where the aimer spot is projected), the "enhanced contrast aimer pixels" image will have the undesired pixels (where presumably there is no aimer spot) with a value of 0 and the desired pixels (where presumably there is an aimer spot) with the pixel value of the third image. At this point it may be easier to detect the most probable aimer-spot pixels since they will be the ones with the greatest pixel values in this "enhanced-contrast aimer pixels" image, and they can be compared with a threshold based on a fraction of the maximum pixel value of this latter image. With the type of processing as described in this example, there is a balanced approach between the ideal and the realistic operational cases, and a good performance may be achieved in terms of aimer spot detection (with few false positives and few false negatives) despite all the nonidealities that might affect the detection in most of the operational cases (e.g., lighting noise, laser speckle, target movement in the field of view).

In related embodiments, more advanced techniques may be applied that compare candidate aimer spot locations in successive difference frames (in which actual the aimer spot is expected to vary in accordance with a known modulation pattern or encoded value) against a reference signal representing that known modulation pattern of encoded value, and discarding candidate aimer spot locations that fail to correspond with the known modulation pattern.

In other related embodiments, a filtering operation may be performed, such as thresholding on the difference frames in order to produce a set of candidate aimer spot locations in which the differences from frame to frame that are in excess of a threshold are present, and all other difference values that do not meet the difference threshold are excluded from the set of candidate aimer spot locations. The threshold may be predefined, or it may be dynamically set based on a defined set of criteria. For example, threshold-setting criteria may be based on the average dynamic range in a captured image frame (e.g., 70% of the dynamic range). Other thresholding may include windowing (i.e., setting an upper and a lower boundary), and excluding difference values that fall outside of the defined range. The windowing boundaries may be varied based on the dynamic range, and also based on the aimer spot modulation pattern.

In other embodiments, additional filtering, such as noise reduction or motion effect filtering (e.g., erosion, dilation, blur), etc., may be used in conjunction with the image-processing operations of image processing 806.

In one type of embodiment, image-processing operation 806 may include combining the captured image frames at each capture point from the multiple image sensors to produce a single series of frames for processing.

The output of localization phase 712, localization set 722, may include a set of coordinates of candidate aimer spot locations. In a related embodiment, localization set 722 may also include spot size for each candidate aimer spot location. For example, each candidate aimer spot may be defined by its (x,y) position and spot size (e.g., spot width and height in pixels or spot pixel count).

Figure 10:
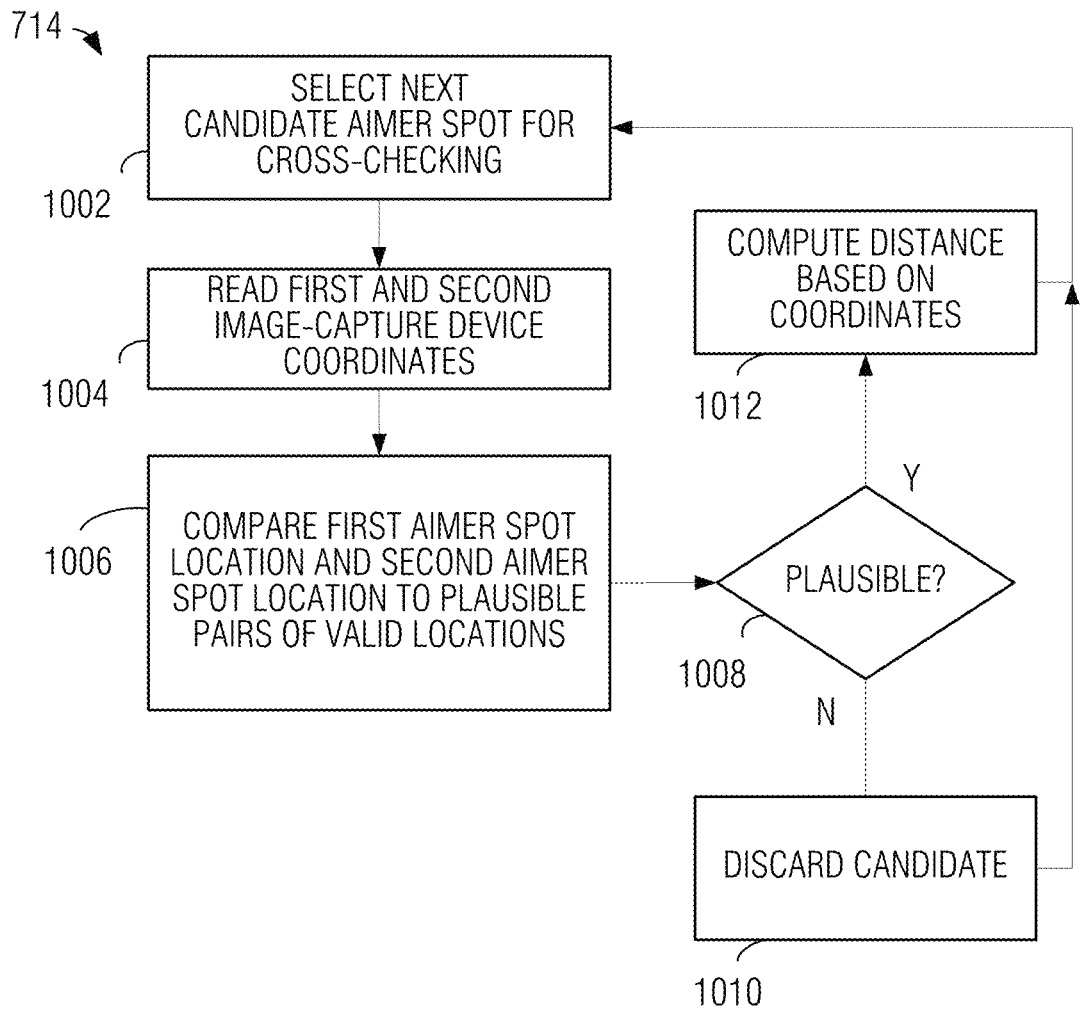
FIG. 10 is a flow diagram illustrating some of the operations of a triangulation phase according to some embodiments.

FIG. 10 is a flow diagram illustrating some of the operations of triangulation phase 714 according to some embodiments. The operation includes cross-checking at each candidate aimer spot to determine if that candidate aimer spot is plausible. Accordingly, at 1002 the next candidate aimer spot from the set of candidates, as read from the output of localization phase 712, is selected. At 1004, the aimer spot coordinates of the selected candidate aimer spot as captured from each image-capture device 102, are read. Each image-capture device 102 is positioned at a different mechanical offset from the aimer transmitter 112; in addition, in some embodiments the different image capture devices have different fields of view. Accordingly, the position of the aimer spot, as captured by the different image-capture devices is different.

Figure 11:
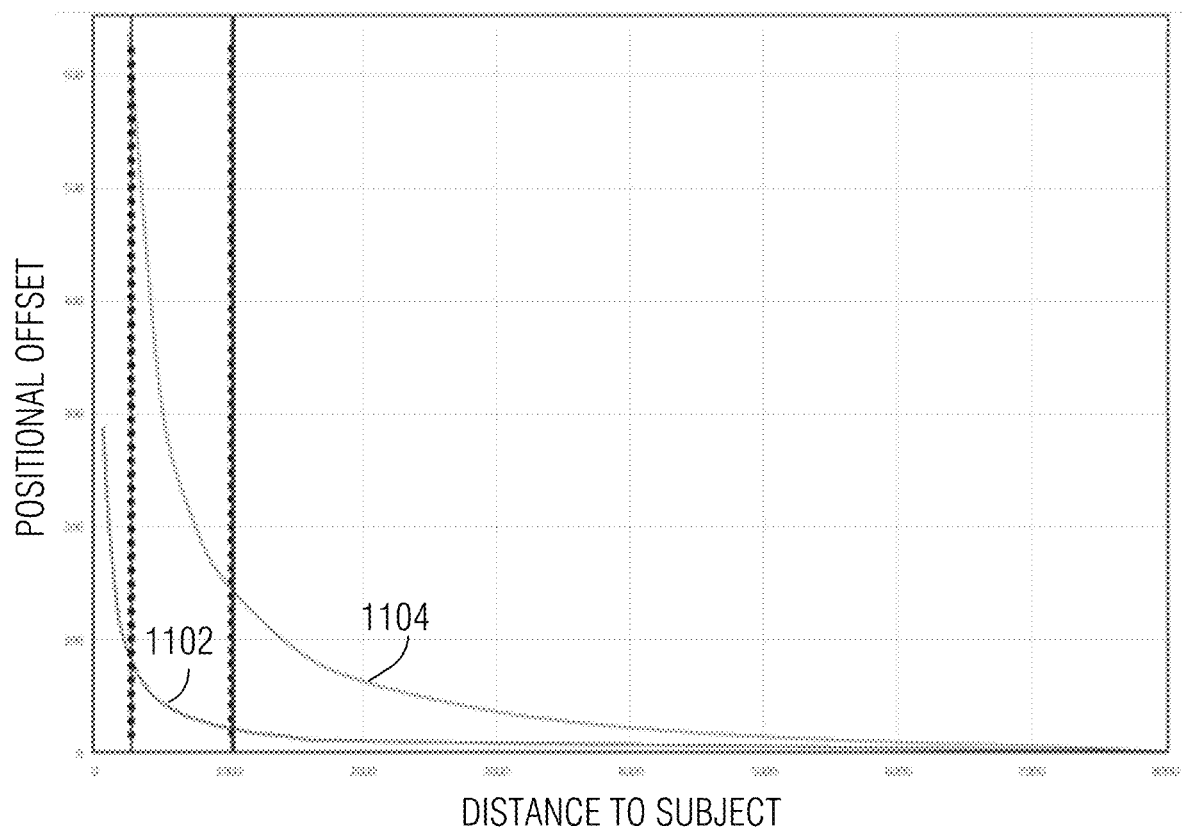
FIG. 11 is a graph illustrating an example of positional offsets of the aimer spot as seen by image capture devices in different locations of an example scanning system.

FIG. 11 is a graph illustrating an example of positional offsets (in pixels) of the aimer spot for a first image capture device and a second image capture device of an example scanning system 100. As shown, curve 1102 corresponds to positional offset values of an aimer spot as captured by first image-capture device 102A, whereas curve 1104 corresponds to positional offset values of an aimer spot as captured by second image-capture device 102B. Therefore, at any given distance, the positional offsets are different as between the two types of image-capture devices.

Figure 12:
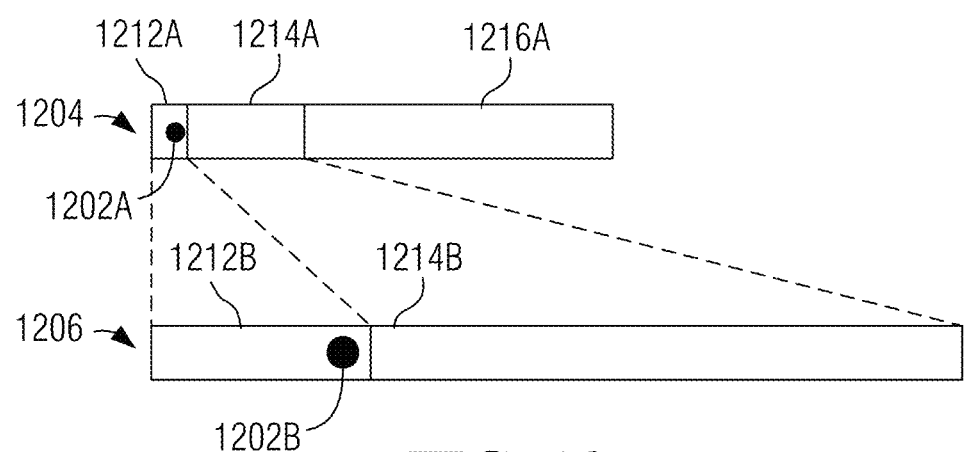
FIG. 12 is a diagram illustrating a pair of captured-image portions in which an aimer spot is shown, as captured respectively by different image-capture devices, according to an example.

FIG. 12 is a diagram illustrating a pair of captured-image portions 1204 and 1206 in which an aimer spot 1202A, 1202B is shown, as captured respectively by first image-capture device 102A and second image-capture device 102B, according to an example. Each captured-image portion 1204, 1206 may be divided into regions, as indicated at 1212A, 1214A, and 1216A for first image-capture device image portion 1204, and regions 1212B and 1214B for second image-capture device image portion 1206. In this example, regions 1212A and 1212B correspond to ranging distances greater than 1 m in this example. Regions 1214A and 1214B correspond to ranging distances between 25 cm and 1 m in this example. Region 1216A corresponds to ranging distances less than 25 cm in this example and is therefore only visible in the first image-capture device image 1204 due to its particular field of view in this example. Each region corresponds to a plausible aimer-spot offset amount according to various distances from the target surface. Based on the respective mechanical offsets from aimer transmitter 1212 and the respective fields of view, an aimer spot appearing in region 1212A of first image sensor image portion 1204 would be expected to appear in region 1212B of second image sensor image portion 1206, and vice-versa. Likewise, an aimer spot appearing in region 1214A of first image sensor image portion 1204 would be expected to appear in region 1214B of second image sensor image portion 1206, and vice-versa.

Referring again to FIG. 10, at 1006, the first aimer spot location corresponding to the first image-capture device and the second aimer spot location corresponding to the second image-capture device are compared against a predefined set of plausible values, such as those shown in FIG. 11 (which may be stored in controller 120), or against predefined regions, such as those shown in FIG. 12 (which may be stored in controller 120). If the offset values correspond to the predefined set of values or fall within expected regions, the aimer spot location is deemed plausible, and a distance to the target surface is computed based on the coordinates of the candidate aimer spot location at 1012. Otherwise, if the offset values fall outside of the applicable values or regions, the candidate aimer spot location is discarded at 1010. After either accepting as viable, or discarding, the candidate aimer spot location, the process repeats for the next candidate aimer spot if there is one or more candidate aimer spot to consider.

Computation of distance at 1012 may be performed based on the formula $$D[\text{mm}]=a/(b*x[\text{pixels}]+c)+d,$$

where a, b, c, and d are calibrated constants determined empirically for scanning system 100 as part of the manufacturing process. Every camera has different constants based on mechanical offset with respect to the aimer and its field of view. An example of a method to match locations with a predefined set of values (e.g., as shown in FIG. 11) is to compute distance from the aimer spot location using the formula based on the calibrated constants of the camera used to capture such aimer spot. Aimer spots from different cameras are expected to match only if their computed distance difference is below a predefined threshold.

Figure 13:
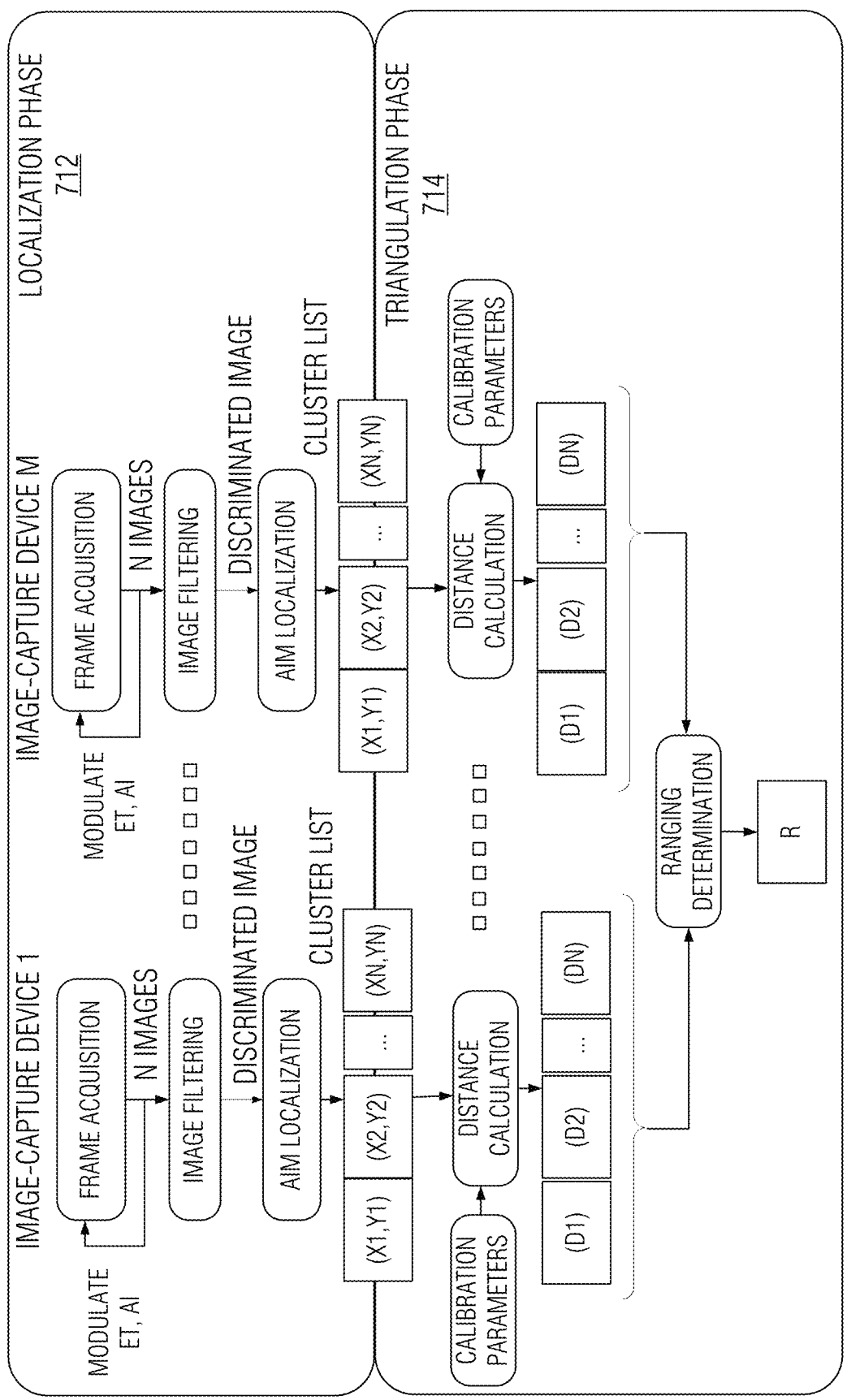
FIG. 13 is a diagram illustrating the functionality of an implementation of a localization phase and a triangulation phase according to a particular example.

FIG. 13 is a diagram illustrating the functionality of an implementation of localization phase 712 and triangulation phase 714 according to a particular example. In this example, the number of image-capture devices is generalized to M image capture devices. As shown, in localization phase 712, each image-capture device acquires image frames while the received aimer spot is modulated. Modulation can be achieved by varying the exposure time ET for the aimer spot, the aimer intensity (AI), or some combination of these. N image frames are captured and processed, where they may be compared and filtered with thresholding, windowing, and decoding, where applicable, with optional additional filtering operations applied to reduce noise, movement artifacts, or the like. The result of this processing is a discriminated image frame in which the candidate aimer spot locations are discriminated from interfering sources. The location coordinates for each of these candidate aimer spot locations are placed in a cluster list, which is readable by triangulation phase 714. Also, cluster size might be placed in the cluster list as additional information.

In triangulation phase 714, each cluster list is processed to compute the distance by triangulation, which produces a list of potential distances D1-DN, from which a most appropriate distance may be selected as the ranging determination R. Selection of the most appropriate ranging determination may involve cross-checking as discussed above, cluster size checking, cluster size checking related to the estimated distance, or other selection criteria or a combination of the above.

A further aspect of this disclosure is directed to an automatic system operative to detect any mechanical misalignments in the image sensor(s) and aimer transmitter(s) that may occur after initial calibration in production. These misalignments can be related to strong mechanical shocks or extreme temperature variations during the life of the scanner device, resulting in deformation of the frame or enclosure, or optical components of the scanner. Such mechanical or thermal events may cause the system to stabilize in a state in which the aimer spot or pattern is different than the originally-manufactured position which, in turn, can degrade the performance of the triangulation operation that computes the distance from the projected aimer spot or pattern. These distance measurements that are used for lens focusing, and the aimer positioning within images that is used for features such as pick-list decode, can be adversely impacted by a degradation in triangulation and aim spot detection accuracy.

An automatic compensation or recalibration system according to some embodiments can correct such detected problems. As one principle which may be utilized in some embodiments, a more-reliably-fixed first set of mechanical or optical characteristics of the system may be relied upon as a reference usable to achieve a correction or recalibration for misalignment of a second set of mechanical or optical characteristics which are less-reliably fixed. As described in greater detail below, in various embodiments, the more-reliably-fixed first set of mechanical or optical characteristics may include:

in implementations using multiple image-capture devices 102, one of the image-capture devices 102 and one of the aim transmitter may be integral with, or fixed to, a chassis or central axis of the scanner device and in a way that is more reliable in retaining its position when the scanner device subjected to mechanical or thermal stresses; or in implementations utilizing multiple aimer beams, the relative distance between the projected aimer spots or patterns from the multiple beams.

In another type of embodiment, the scanner device may be intrinsically designed and constructed such that any misalignments which may occur after initial fabrication or calibration are intrinsically less probable to occur, or are detectable. One such approach for achieving aimer spot detection enhancement, utilizes two or more divergent aimer beams that diverge at an angle that causes the beams to produce aimer spots or patterns at the same relative distance within the captured image frame, regardless of distance to the subject surface onto which the aimer spots or patterns are projected, such that they are less subject to misalignment.

According to a multi-image-capture-device embodiment (which may have a configuration consistent with the examples of FIG. 4A or FIG. 4B), at least two image-capture devices 102 (which may be referred to more simply as "cameras" for the sake of simplicity) are provided as part of a scanner device: at least one reference camera, and at least one support camera. In the following description, a two-camera embodiment is described for ease of explanation; however, it will be understood that in related embodiments additional reference or support cameras may be provided.

The reference camera has a relatively higher detected aimer spot pixel position-to-distance resolution than the support camera, and the reference camera is assumed to be unaffected by mechanical or thermal variations. For instance, the reference camera may be positioned along a central axis or spine of the device, it may be mounted to the chassis, or it may be robustly coupled to the aimer transmitter such that the reference camera and aimer transmitter are equally affected by any material deformations of the device's housing or chassis. Likewise, the reference camera may have its lens affixed more robustly and hence less susceptible to movement or misalignment.

The support camera may be a simpler camera having the same or lower detected aimer spot pixel position-to-distance resolution compared to the reference camera. In some implementations, the support camera is situated at a smaller distance from the aimer transmitter than the reference camera. In other implementations, the support camera is situated at a greater distance from the aimer transmitter than the reference camera. In some implementations, the support camera may be used to confirm the aimer spot position detected by the reference camera, such that non-matching aimer-spot detected locations may be discarded as false (which may be due to reflections, external lights, or other noise). The support camera may also be used to cover distances for which the main camera is less suitable for performing triangulation (i.e. close distances).

During fabrication of the scanner device, each camera may be calibrated to determine distance based on the detected aimer spot. Such calibration may include: determination of aimer spot position inside the image (e.g., x, y coordinates) at infinity distance for each camera; generation of a triangulation curve representing the relation between aimer-spot pixel position and distance) for both cameras; and fixing a search region inside image (ROI) corresponding to the aimer spot position at infinity. This region may be used to reduce the complexity of the localization algorithm and to discard false aimer spots that are mechanically incompatible with the possible aimer spot positions.

In a dual-camera triangulation algorithm, aimer spot localization according to one example is performed along a horizontal strip set at a fixed y position inside the image. This approach assumes there is no mechanical offset in the y direction, so that the aimer spot position varies only along the x direction based on the distance from the scanner device to the target. Displacements due to deformation of the optical arrangement of the scanner device such as by mechanical or thermal shock, can be considered as an offset on the (x,y) position at infinity and the triangulation formula is still valid although translated by a fixed amount.

Figure 14A:
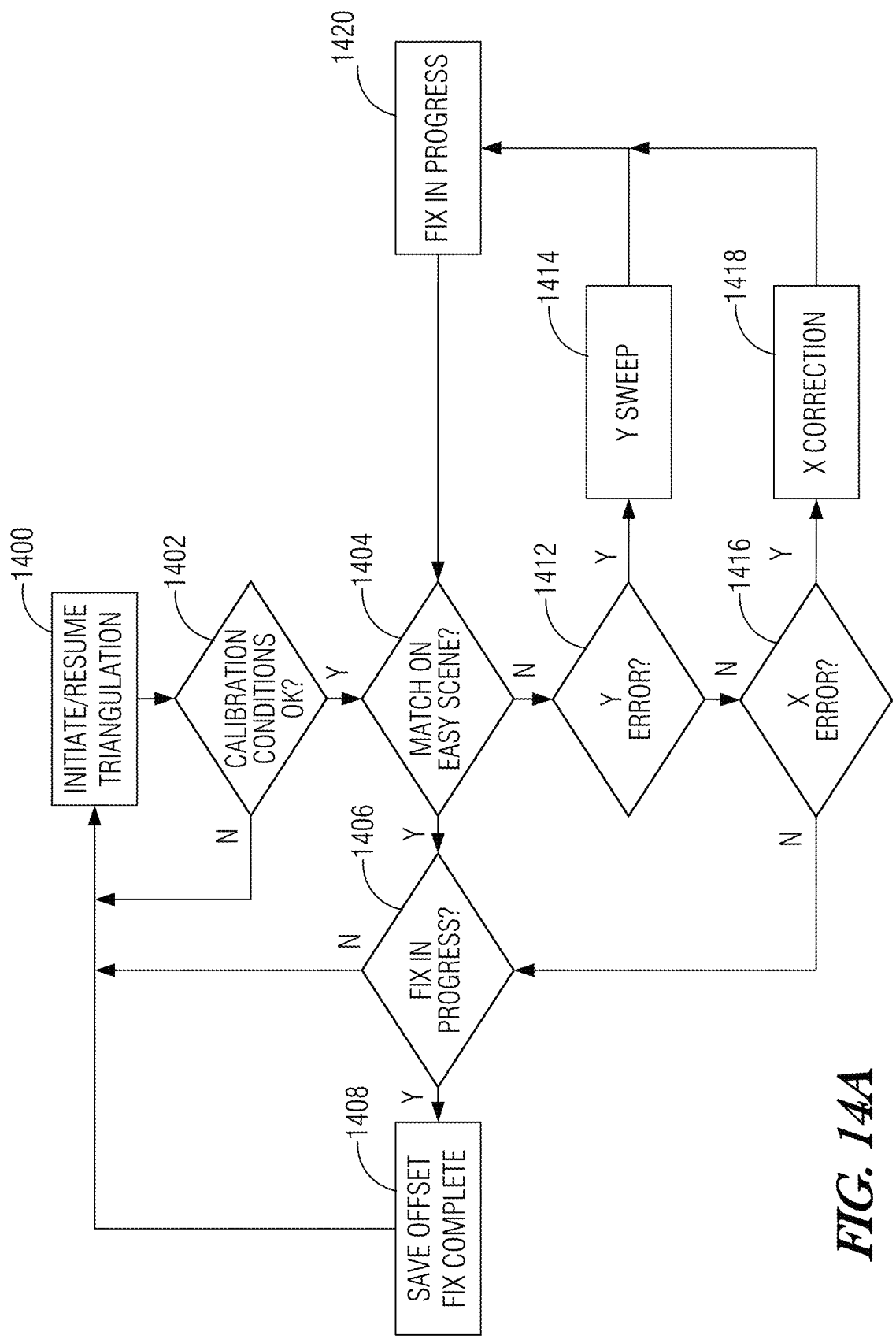
FIG. 14A is a flow diagram illustrating an example in-situ misalignment detection and calibration process that may be carried out by a scanner device in accordance with some of the embodiments described herein.

FIG. 14A is a flow diagram illustrating an example in-situ misalignment detection and calibration process that may be carried out by a scanner device in accordance with some of the embodiments described herein. The process may be executed by controller 120. At 1400 the triangulation process as described above is initiated (or resumed). Prior to completing the distance determination, decision 1402 determines whether in situ calibration is to be performed by applying predefined decision criteria. In various implementations, the predefined criteria may include one or more of the following conditions: each time the triangulation is initiated after a predefined passage of time; if a prior attempt to read a symbol failed or some other malfunction occurred; if an accelerometer of the scanner device registered a mechanical shock event; if a temperature sensor of the scanner device registered a rapid temperature change; every $n^{th}$ activation of the scanner device; or randomly.

In addition, decision 1402 may determine whether conditions for performing the in-situ calibration are suitable. For example, decision 1402 may determine whether the present scene as captured by at least the reference camera is an "easy" scene. Generally, an easy scene provides a clear view of the aimer spot to both cameras and lacks extraneous light sources, reflections, or other noise, such that the aimer spot is clearly and unambiguously identifiable by each camera.

As one example, decision 1402 may apply criteria that calls for analyzing the entire frame of the image captured by the reference camera for the presence of aimer spots, and in the image there must be exactly one aimer spot which is at a location corresponding to a predefined distance at which the support camera is deemed useful to assist with triangulation. The predefined distance criteria may be specified as a range of distances within which the support camera is designed to capture the aimer spot with a minimum resolution. If the calibration is not to be performed, the process loops back to operation 1400 to resume the triangulation operation.

If decision 1402 determines that performing of the in situ calibration is appropriate, the process advances to decision 1404, which determines whether there is a match between the triangulation results of the reference and support cameras. In this example, the reference camera captures a first image that contains a primary distance indicator, namely, the position of the aimer spot in the image captured by the reference camera. The support camera captures a second image containing a secondary distance indicator, namely, the position of the aimer spot in the second image.

Figure 14B:
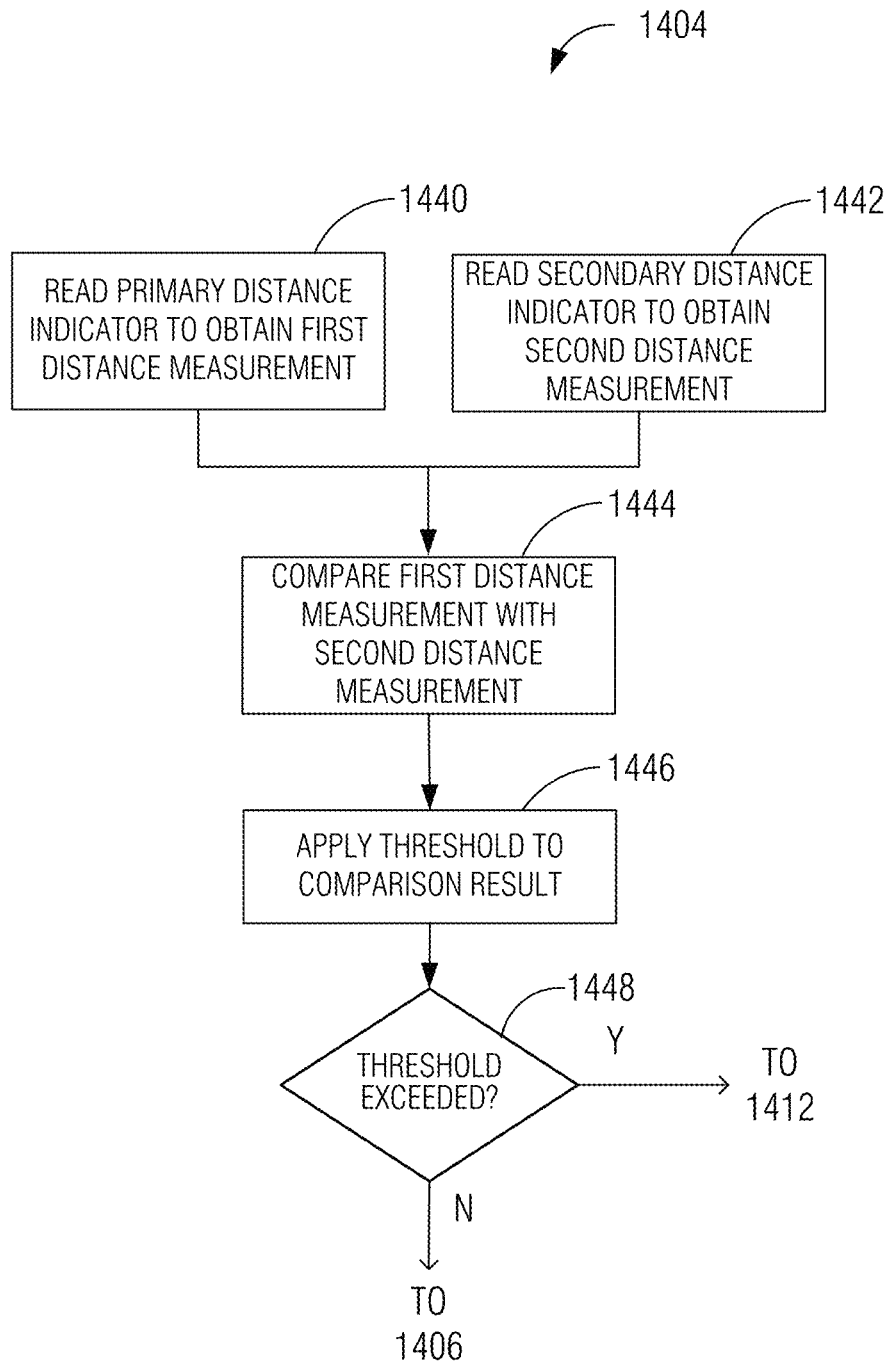
FIG. 14B is a flow diagram illustrating an example of a decision to determine whether a match exists between a primary distance indicator and a secondary distance indicator under easy-scene conditions, according to some embodiments.

FIG. 14B is a flow diagram illustrating an example of decision 1404 in greater detail according to one implementation. At 1440, the primary distance indicator is read to obtain a first distance measurement. In a two-camera embodiment, this first distance measurement is deemed reliable since it is made by the reference camera under "easy-scene" conditions. At 1442, the secondary distance indicator is read to obtain a second distance measurement. In a two-camera embodiment, the secondary distance indicator is obtained from an image captured by the support camera. This secondary distance measurement is in question. At 1444, the first distance measurement is compared with the second distance measurement to produce a comparison result. At 1446, the comparison result is compared against a predefined threshold to test whether the difference between the first distance measurement and the second distance measurement is large enough to warrant correction. If, at 1448, the threshold is exceeded, the process advances to 1412-1420 (FIG. 14A) to determine the possibility of misalignments and to perform a compensation procedure.

Accordingly, at 1412, a determination is made whether there is an error along the y axis. One such technique involves first determining if an aimer spot is present in the support image's horizontal strip where the aimer spot is expected to be located. If the aimer spot is not present in that strip, the strip is swept vertically along the y direction at 1414, and the process loops back to decision 1404 to check for a match. To facilitate process flow, operation 1420 sets a flag or other indicator to represent that an in situ calibration is in progress.

On an iteration that determines no y error at decision 1412, meaning that the aimer spot is visible in both cameras' image sensors, the process advances to decision 1416, which tests for any x-axis displacement of the support camera. In one such example, the x-axis position of the aimer spot as detected by the reference camera (presumed to be properly aligned) is used to compute the reference distance to the target surface onto which the aimer spot is projected. This reference distance is then used to compute the expected x position of the aimer spot as captured by the support camera. Any difference from the expected position is computed and used to make an offset correction at 1418.

Once this correction has been made, the support camera's triangulation-based distance measurement will match the distance measurement of the reference camera. When the process loops back to decision 1404, the match will advance the process to decision 1406, which checks whether the calibration-in-progress flag is set. In the affirmative case, the newly-determined x or y corrections are saved, and the in-progress flag is cleared at 1408.

In related embodiments, the process of FIG. 14A may be adapted for other scanner device configurations. As an example of such a variation, configurations with multiple aimer beams (e.g., produced by multiple aimer transmitters 212 as depicted in FIG. 4C, by a single aimer transmitter with the assistance of an optical system as depicted in FIG. 4D) or with may be supported. Referring to FIG. 14B, in one such embodiment, the primary distance indicator corresponds to a first aimer beam's reflected spot location, whereas the secondary distance indicator corresponds to a second aimer beam's reflected spot location.

Figure 15:
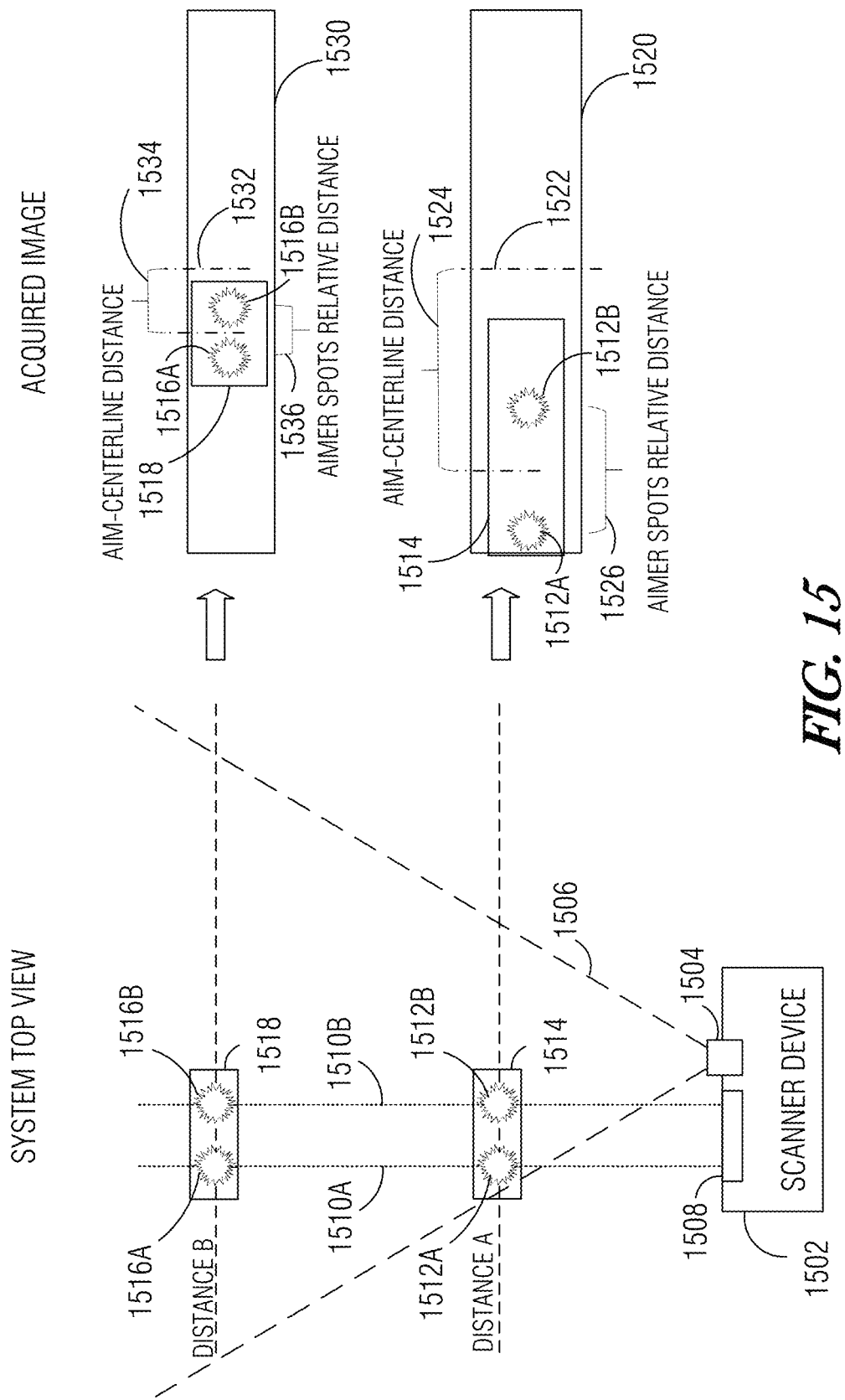
FIG. 15 is a schematic diagram illustrating principles of operation of a multi-aimer-beam scanner device according to some embodiments.

FIG. 15 is a schematic diagram illustrating principles of operation of a multi-aimer-beam scanner device 1502. For the sake of simplicity of explanation, scanner device 1502 has a single image-capture device 1504 (e.g., a camera); however, it will be understood that multiple image-capture devices may be employed in more sophisticated systems. Camera 1504 has a field of view indicated at 1506. Scanner device 1502 also includes a multi-beam aimer projection system 1508, which produces aimer beams 1510A and 1510B. In this example, aimer beams 1510A and 1510B are parallel. Accordingly, aimer projection system 1508 produces aimer spots 1512A and 1512B on target 1514 situated at a relatively closer distance indicated as Distance A. Likewise, aimer projection system 1508 produces aimer spots 1516A and 1516B at target 1518 that is located at a relatively greater distance, Distance B.

Portions of the images as captured by camera 1504 at Distances A and B are depicted on the right side of FIG. 15. Image 1520 captured at Distance A contains target 1514, as well as aimer spots 1512A and 1512B. Since target 1514 is located towards the left side of field of view 1506, target 1514 in image 1520 and aimer spots 1512A and 1512B are located on the left side of centerline 1522 at aim-centerline distance 1524 as shown. Aim-centerline distance 1524 in this case is the distance from the centerline 1522 to the midpoint (or average distance) of the set of aimer spots

1512. Also, as shown, aimer spots 1512A and 1512B are separated from one another at relative distance 1526.

Image 1530 captured at Distance B contains target 1518 and aimer spots 1516A and 1516B. Notably, target 1518 and aimer spots 1516A and 1516B are closer to centerline 1532 at aim-centerline distance 1534 (the average aimer spot distance) than distance 1524 in the case of the Distance A due to the perspective. Likewise, aimer spots 1516A and 1516B are separated from one another at distance 1536, which is smaller than distance 1526 at distance A due to the perspective.

For purposes of performing triangulation, the distances of the aim patterns, namely, distances 1524 and 1534, are used. The triangulation principle is consistent with the above-described triangulation techniques: since the aimer beams are parallel to the optical axis, the relative distance between the two projected aimer spots varies with the distance of the target 1514, 1518 with a known proportion. Hence, the triangulation behavior of the scanner device 1502 depends on the distance of the aimer projection system 1508 from the camera 1504 on the scanner device 1502.

Moreover, additional triangulation information can be used to facilitate detection of the aimer spots and exclude extraneous lights/reflections or other noise. For instance, the dual-aimer pattern in this example is useful to discriminate the aimer spot from noise in complex scenes where other elements, reflections, external light sources, or other noise might be incorrectly detected as an aimer spot. Likewise, use of the average aimer spot location for aimer-centerline triangulation adds robustness to the system. Further, the aimer-spot relative distances 1526 and 1536 are separately indicative of the distance to the target 1514, 1518 from the scanner device 1502.

Referring again to FIG. 14A, the basic process can be used to perform in situ calibration of a multi-beam scanner device. At 1402, an easy scene may be similarly identified as described above using a single camera, except that with the use of multiple aimer spots, the criteria for determining an easy scene call for finding exactly the number of aimer spots as are projected by the projection system 1508.

At 1404, the matching may be performed based on an assumption that the aimer beams remain in alignment with one another, while the camera alignment might move from its initial position. Accordingly, a distance to the target 1514, 1518 may be computed according to a known relationship between the aimer spot relative distance 1526, 1536, and the computed distance to the target may be compared against the distance determined from triangulation of the aimer-centerline distance 1524, 1534 to determine whether a match exists.

At 1412, the y displacement of the camera may be determined at 1412-1414 and compensated as described above. An x displacement of the camera is intrinsically tolerated, because it does not affect the relative pointers distance in the image. However, the camera displacement may be compensated at 1416-1418 based on the determined error between the triangulation distance computed using the aimer pattern-centerline distance 1524, 1534, and the reliable reference distance based on the aimer spot relative distance 1526, 1536.

Figure 16:
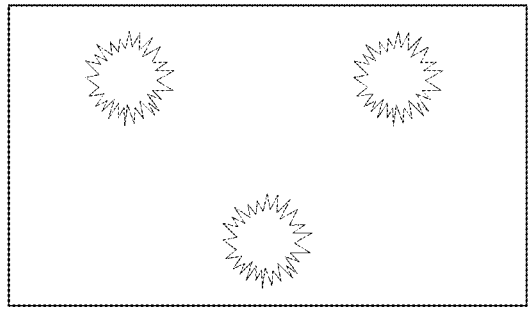
FIGS. 16-18 illustrate various examples of aimer patters.
Figure 17:
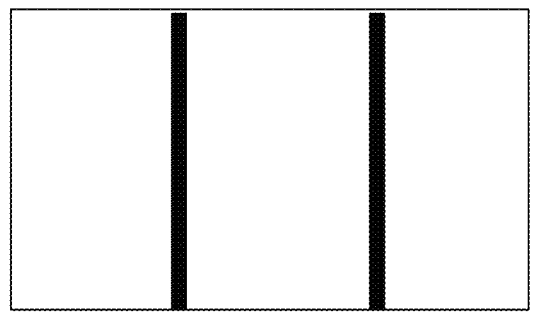
Figure 18:
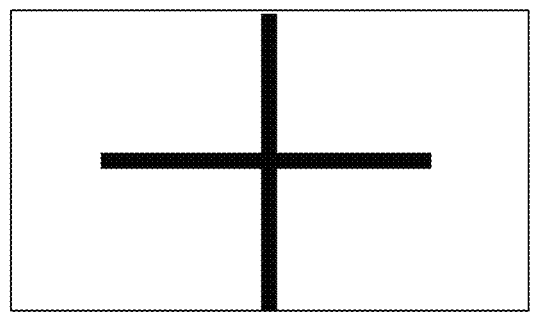

In related embodiments, more advanced aimer patterns may be used. FIGS. 16-18 illustrate various examples of aimer patters. In FIG. 16, a tri-beam aimer pattern is shown, with the aimer spots positioned equidistantly. This pattern allows the y sweep at 1414 to proceed in the correct direction to locate the full pattern. Accordingly, if only one aimer spot is visible, the sweep may be performed in the +y direction to capture the two aimer spots above the single spot. Likewise, if two aimer spots are visible, then they sweep at 1414 may proceed in the −y direction.

The example of FIG. 17 utilizes a dual-bar pattern, which may be implemented with a variety of systems such as a vertically-scanned laser emitter, or a more simple laser plus beam shaping lens, or with LED(s) plus lens assembly. The dual-bar pattern as depicted may obviate having to perform a y sweep to locate the aimer pattern since it spans a greater portion of the image. Moreover, a linear pattern is more easily distinguishable from spurious light sources or noise in the image, making this a more robust aimer pattern for complex scenes.

A variety of other aimer patterns may be utilized to provide additional advantages. For instance, the example depicted in FIG. 18 is a cross-shaped pattern. A pattern having this shape may aid a human user of the scanner device to point the camera of the device at the subject item to be scanned. A pattern such as a cross in this example is larger than one or more aimer spots, and hence more easily seen from a distance, particularly in brightly-lit environments. Then, for the purpose of reliability and recalibration check, the length of the arms of the cross might be checked and used as a reliable element of the system for match and compare with the triangulation of the cross center, thus checking the alignment of aimer and camera(s), detecting any misalignment, and, if needed, issuing a call for recalibration.

Another type of embodiment is directed to an aimer system that utilizes multiple divergent beams. An example arrangement according to this type of embodiment is illustrated schematically in FIG. 19. For the sake of simplicity of explanation, scanner device 1902 has a single image-capture device 1904 (e.g., a camera); however, it will be understood that multiple image-capture devices may be employed in more sophisticated systems. Camera 1904 has a field of view indicated at 1906. Scanner device 1902 also includes a multi-beam aimer projection system 1908, which produces aimer beams 1910A and 1910B. In this example, aimer beams 1910A and 1910B are divergent at an angle, thus causing the aimer spots 1912A, 1912B at Distance A, or aimer spots 1916A, 1916B at Distance B, to be at the same relative distance within the captured images 1920, 1930, regardless of distance to the target 1914, 1918.

Figure 19:
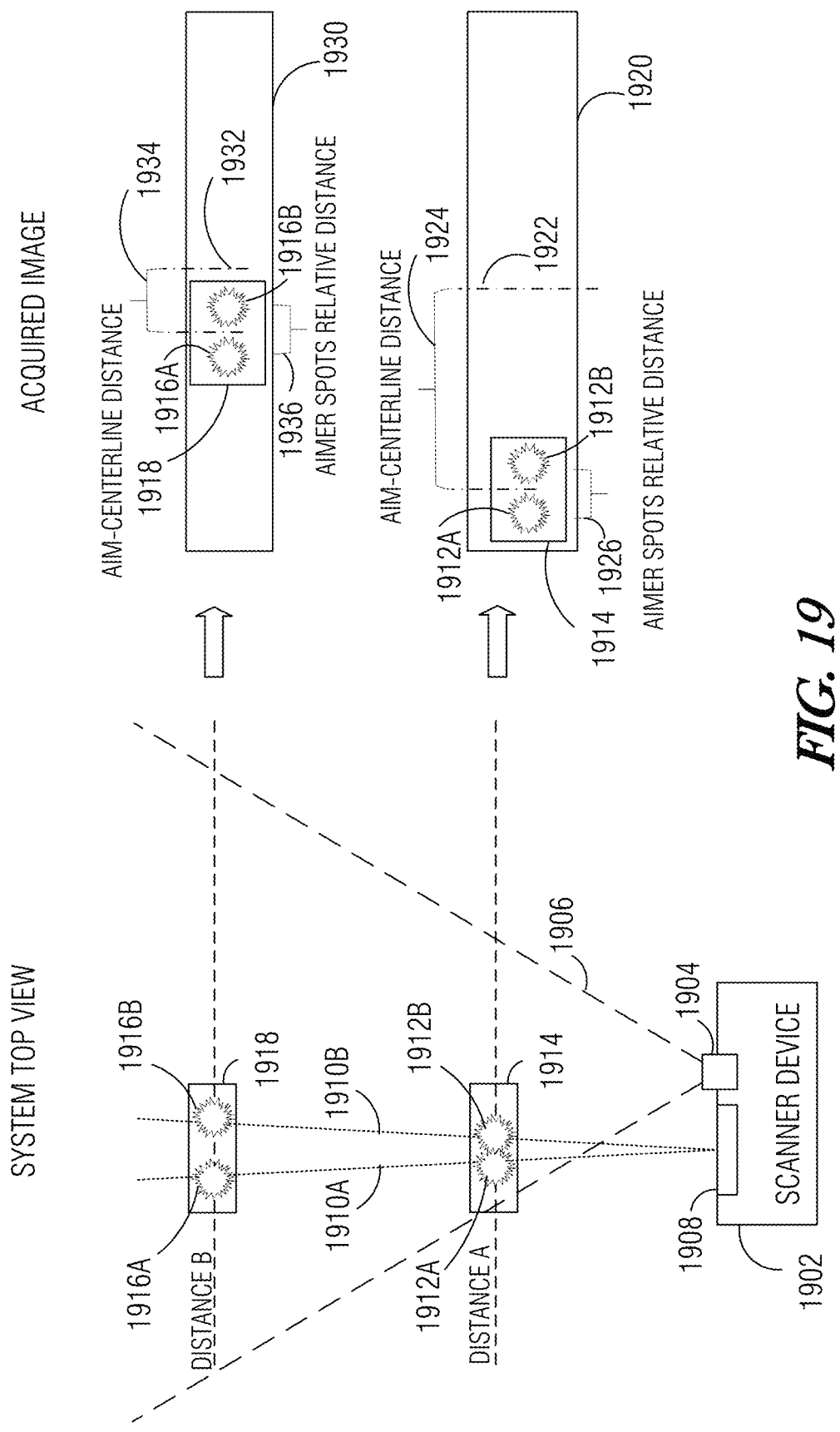
FIG. 19 is a schematic diagram illustrating principles of operation of an aimer system that utilizes multiple divergent beams according to some embodiments.

Portions of the images as captured by camera 1904 at Distances A and B are depicted on the right side of FIG. 19. Image 1920 captured at Distance A contains target 1914, as well as aimer spots 1912A and 1912B. Since target 1914 is located towards the left side of field of view 1906, target 1914 in image 1920 and aimer spots 1912A and 1912B are located on the left side of centerline 1922 at aim-centerline distance 1924 as shown. Aim-centerline distance 1924 in this case is the average distance of the set of aimer spots 1912. Also, as shown, aimer spots 1912A and 1912B are separated from one another at relative distance 1926.

Image 1930 captured at Distance B contains target 1918 and aimer spots 1916A and 1916B. Notably, target 1918 and aimer spots 1916A and 1916B are closer to centerline 1932 at aim-centerline distance 1934 (the average aimer spot distance) than distance 1924 in the case of the Distance A due to the perspective. Aimer spots 1916A and 1916B are separated from one another at distance 1936, which is the same distance as distance 1926 at distance A.

For purposes of performing triangulation, the distances of the aim patterns, namely, distances 1924 and 1934, are used. The triangulation principle is consistent with the above-described triangulation techniques. This system is potentially less subject to misalignment since it may be implemented using fewer components than other embodiments. For instance, it may be implemented with only one aimer transmitter and only one camera system. However, if a displacement occurs to one or both of the aimer beams 1910A, 1910B, it is likely that the relative aimer-spot distance 1926, 1936 will change. This feature allows the occurrence of the displacement to be detected.

Similarly to the embodiments described above with reference to FIG. 15, the fixed relative distance 1926, 1936 of the aimer spots can be used to facilitate detection of the aimer spots and exclude extraneous lights/reflections or other noise. For instance, the dual-aimer pattern in this example is useful to discriminate the aimer spot from noise in complex scenes where other elements, reflections, external light sources, or other noise might be incorrectly detected as an aimer spot. Likewise, use of the average aimer spot location for aimer-centerline triangulation adds robustness to the system.

The process of FIG. 14A may be adapted to the divergent-beam arrangement of the embodiments of FIG. 19 in similar fashion to the parallel-beam embodiments of FIG. 15, with two exceptions. First, the match determination at 1404 is replaced with a comparison of the currently-captured relative aimer-spot distance 1926, 1936 with a previously-configured reference distance to detect an aimer-spot spacing error (to be treated as a non-match for purposes of the algorithm of FIG. 14A). A second exception is that the x error can be determined at 1416, but this arrangement does not support automatic in situ calibration at 1418. A notification to the system and to the user might be issued and some corrective actions might be arranged and studied in order to re-calibrate the device with user intervention. The y error detection and correction operations are similar to those described above at operations 1412-1414.

While the disclosure is susceptible to various modifications and alternative forms, specific embodiments have been shown by way of example in the drawings and have been described in detail herein. However, the disclosure is not limited to the particular forms disclosed. Rather, the disclosure is to cover all modifications, equivalents, and alternatives falling within the scope of the following appended claims and their legal equivalents. For example, the various aimer patterns as described with reference to FIGS. 16-18, as well as other patterns, may be employed in the various embodiments described above with reference to FIGS. 12-15 and 19.

Additional Notes and Examples

Example 1 is an apparatus of an optical scanner for scanning a subject, the apparatus comprising: interface circuitry including an input to receive an at least one image from at least one image-capture device of the optical scanner; and controller circuitry coupled to the interface circuitry and the input, the controller circuitry operative to process the at least one image to determine ranging between the optical scanner and the subject based on (a) projection of at least one aimer beam by an aimer projector system of the optical scanner to produce a corresponding at least one reflection off of a surface of the subject, and (b) detection of a position of the at least one aimer-beam reflection within the at least one image, wherein: the position of the at least one aimer-beam reflection within the image is a primary indicator of a distance between the surface of the subject and the at least one image-capture device of the optical scanner; and the at least one image includes, a secondary indicator of the distance between the surface of the object and the at least one image-capture device, and wherein the secondary indicator is used in combination with the first indicator to detect an occurrence of an optical misalignment of the optical scanner.

In Example 2, the subject matter of Example 1 includes, wherein the secondary indicator is further used to discriminate the reflection of the at least one aimer beam off of the surface of the subject from spurious light sources or other noise in the at least one image.

In Example 3, the subject matter of Examples 1-2 includes, wherein the optical scanner comprises an enclosure, and wherein the interface circuitry and the controller circuitry, the aimer projector system, and the at least one image-capture device are all housed within the enclosure.

In Example 4, the subject matter of Examples 1-3 includes, wherein the at least one image-capture device comprises at least a first image-capture device and a second image-capture device; and wherein a first image captured by the first image-capture device includes the primary indicator of the distance; wherein a second image captured by the second image-capture device includes the secondary indicator of the distance; and wherein the controller circuitry is further operative to perform a first comparison of a first distance between the surface of the subject and the first image-capture device as represented by the primary indicator of the distance against a second distance between the surface of the subject and the second image-capture device as represented by the secondary indicator of the distance to produce an indication of the optical misalignment.

In Example 5, the subject matter of Examples 1-4 includes, wherein the controller circuitry is further operative to compute a value corresponding to an amount of the optical misalignment and determine a compensation value for the secondary indicator based on the measured value.

In Example 6, the subject matter of Examples 1-5 includes, wherein the at least one aimer beam comprises n beam(s), and wherein the controller circuitry is further operative to: determine whether each of the at least one image contains an easy scene having exactly n beam reflections; and perform detection of the occurrence of any optical misalignment only in response to a positive determination of the at least one image containing an easy scene.

In Example 7, the subject matter of Examples 1-6 includes, wherein the at least one reflection off of the surface of the subject comprises at least one aimer spot.

In Example 8, the subject matter of Examples 1-7 includes, wherein the at least one reflection off of the surface of the subject comprises an aimer pattern.

In Example 9, the subject matter of Example 8 includes, wherein the aimer pattern comprises a plurality of aimer spots arranged at different horizontal and vertical locations on the surface of the subject.

In Example 10, the subject matter of Examples 8-9 includes, wherein the aimer pattern comprises a plurality of lines arranged at different locations on the surface of the subject.

In Example 11, the subject matter of Examples 8-10 includes, wherein the primary indicator of the distance between the surface of the subject and the at least one image-capture device of the optical scanner includes a distance between a centerline of the at least one image and a midpoint position of the aimer pattern.

In Example 12, the subject matter of Examples 1-11 includes, wherein the at least one aimer beam includes two parallel beams, and wherein the secondary indicator of the distance between the surface of the object and the at least one image-capture device comprises a relative distance of the corresponding reflections of the two parallel beams.

In Example 13, the subject matter of Example 12 includes, wherein the at least one image-capture device is a single image-capture device.

In Example 14, the subject matter of Examples 1-13 includes, wherein the controller circuitry is further operative to perform detection of the occurrence of any optical misalignment in response to a malfunction of the optical scanner.

In Example 15, the subject matter of Examples 1-14 includes, wherein the controller circuitry is further operative to perform detection of the occurrence of any optical misalignment in response to a detection of a mechanical shock of the optical scanner.

In Example 16, the subject matter of Examples 1-15 includes, wherein the controller circuitry is further operative to perform detection of the occurrence of any optical misalignment in response to a detection of a temperature change of the optical scanner.

Example 17 is an apparatus of an optical scanner for scanning a subject, the apparatus comprising: interface circuitry including an input to receive an at least one image from at least one image-capture device of the optical scanner; and controller circuitry coupled to the interface circuitry and the input, the controller circuitry operative to process the at least one image to determine ranging between the optical scanner and the subject based on (a) projection of a pair of divergent aimer beams projected by an aimer projector system of the optical scanner to produce a corresponding pair of reflections off of a surface of the subject, and (b) detection of a position of at least one aimer-beam reflection of the pair of aimer-beam reflections within the at least one image; wherein the pair of divergent aimer beams are divergent such that the pair of reflections, as captured in the at least one image by the at least one image sensor, are separated from one another by the same separation distance within each captured image, regardless of the ranging; and wherein any change in the separation distance is indicative of an occurrence of an optical misalignment of the optical scanner.

In Example 18, the subject matter of Example 17 includes, wherein the optical scanner comprises an enclosure, and wherein the interface circuitry and the controller circuitry, the aimer projector system, and the at least one image-capture device are all housed within the enclosure.

In Example 19, the subject matter of Examples 17-18 includes, wherein the controller circuitry is further operative to: determine whether each of the at least one image contains an easy scene having exactly 2 beam reflections corresponding to the pair of divergent beams; and perform detection of the occurrence of any optical misalignment only in response to a positive determination of the at least one image containing an easy scene.

In Example 20, the subject matter of Examples 17-19 includes, wherein each reflection off of the surface of the subject comprises one aimer spot.

In Example 21, the subject matter of Examples 17-20 includes, wherein each reflection off of the surface of the subject comprises an aimer pattern.

In Example 22, the subject matter of Example 21 includes, wherein the aimer pattern comprises a plurality of aimer spots arranged at different horizontal and vertical locations on the surface of the subject.

In Example 23, the subject matter of Examples 21-22 includes, wherein the aimer pattern comprises a plurality of lines arranged at different locations on the surface of the subject.

In Example 24, the subject matter of Examples 21-23 includes, wherein an indicator of the distance between the surface of the subject and the at least one image-capture device of the optical scanner includes a distance between a centerline of the at least one image and a midpoint position of the aimer pattern.

In Example 25, the subject matter of Examples 17-24 includes, wherein the at least one aimer beam includes two parallel beams, and wherein an indicator of the distance between the surface of the object and the at least one image-capture device comprises a relative distance of the corresponding reflections of the two parallel beams.

In Example 26, the subject matter of Example 25 includes, wherein the at least one image-capture device is a single image-capture device.

In Example 27, the subject matter of Examples 17-26 includes, wherein the controller circuitry is further operative to perform detection of the occurrence of any optical misalignment in response to a malfunction of the optical scanner.

In Example 28, the subject matter of Examples 17-27 includes, wherein the controller circuitry is further operative to perform detection of the occurrence of any optical misalignment in response to a detection of a mechanical shock of the optical scanner.

In Example 29, the subject matter of Examples 17-28 includes, wherein the controller circuitry is further operative to perform detection of the occurrence of any optical misalignment in response to a detection of a temperature change of the optical scanner.

Example 30 is at least one machine-readable medium including instructions that, when executed by processing circuitry, cause the processing circuitry to perform operations to implement of any of Examples 1-29.

Example 31 is a method for scanning a subject with an optical scanner, the method comprising: receiving at least one image from at least one image-capture device of the optical scanner, the at least one image including at least one reflection of at least one aimer beam off of a surface of the subject; and processing the at least one image to determine ranging between the optical scanner and the subject, including detecting a position of the at least one aimer-beam reflection within the at least one image, wherein: the position of the at least one aimer-beam reflection within the image is a primary indicator of a distance between the surface of the subject and the at least one image-capture device of the optical scanner; and the at least one image includes, a secondary indicator of the distance between the surface of the object and the at least one image-capture device, and wherein the secondary indicator is used in combination with the first indicator to detect an occurrence of an optical misalignment of the optical scanner.

In Example 32, the subject matter of Example 31 includes, wherein the at least one image-capture device comprises at least a first image-capture device and a second image-capture device; and wherein a first image captured by the first image-capture device includes the primary indicator of the distance; wherein a second image captured by the second image-capture device includes the secondary indicator of the distance; and wherein the method further comprises performing a first comparison of a first distance between the surface of the subject and the first image-capture device as represented by the primary indicator of the distance against a second distance between the surface of the subject and the second image-capture device as represented by the secondary indicator of the distance to produce an indication of the optical misalignment.

In Example 33, the subject matter of Examples 31-32 includes, computing a value corresponding to an amount of the optical misalignment and determine a compensation value for the secondary indicator based on the measured value.

In Example 34, the subject matter of Examples 31-33 includes, wherein the at least one aimer beam comprises n beam(s), and wherein the method further comprises: determining whether each of the at least one image contains an easy scene having exactly n beam reflections; and performing detection of the occurrence of any optical misalignment only in response to a positive determination of the at least one image containing an easy scene.

In Example 35, the subject matter of Examples 31-34 includes, wherein the at least one aimer beam includes two parallel beams, and wherein the secondary indicator of the distance between the surface of the object and the at least one image-capture device comprises a relative distance of the corresponding reflections of the two parallel beams.

Example 36 is a method for scanning a subject with an optical scanner, the method comprising: projecting a pair of divergent aimer beams towards a surface of the subject; receiving at least one image from at least one image-capture device of the optical scanner, the at least one image including a pair of reflections of the pair of divergent aimer beams off of the surface of the subject; and processing the at least one image to determine ranging between the optical scanner and the subject, including detecting a position of at least one aimer-beam reflection of the pair of aimer-beam reflections within the at least one image; wherein the pair of divergent aimer beams are divergent such that the pair of reflections, as captured in the at least one image by the at least one image sensor, are separated from one another by the same separation distance within each captured image, regardless of the ranging; and wherein any change in the separation distance is indicative of an occurrence of an optical misalignment of the optical scanner.

In Example 37, the subject matter of Examples 31-36 includes, wherein each reflection off of the surface of the subject comprises an aimer pattern.

In Example 38, the subject matter of Example 37 includes, wherein the aimer pattern comprises a plurality of aimer spots arranged at different horizontal and vertical locations on the surface of the subject.

In Example 39, the subject matter of Examples 37-38 includes, wherein the aimer pattern comprises a plurality of lines arranged at different locations on the surface of the subject.

In Example 40, the subject matter of Examples 31-39 includes, wherein the primary indicator of the distance between the surface of the subject and the at least one image-capture device of the optical scanner includes a distance between a centerline of the at least one image and a midpoint position of the aimer pattern.

In Example 41, the subject matter of Examples 31-40 includes, wherein the at least one image-capture device is a single image-capture device.

In Example 42, the subject matter of Examples 31-41 includes, performing detection of the occurrence of any optical misalignment in response to a malfunction of the optical scanner.

In Example 43, the subject matter of Examples 31-42 includes, performing detection of the occurrence of any optical misalignment in response to a detection of a mechanical shock of the optical scanner.

In Example 44, the subject matter of Examples 31-43 includes, performing detection of the occurrence of any optical misalignment in response to a detection of a temperature change of the optical scanner.

In Example 45, the subject matter of Examples 36-44 includes, determining whether each of the at least one image contains an easy scene having exactly two beam reflections corresponding to the pair of divergent beams; and performing detection of the occurrence of any optical misalignment only in response to a positive determination of the at least one image containing an easy scene.

Example 46 is at least one machine-readable medium including instructions that, when executed by processing circuitry, cause the processing circuitry to perform operations to implement of any of Examples 31-45.

Example 47 is an apparatus comprising means to implement of any of Examples 31-45.

Example 48 is a system to implement of any of Examples 31-45.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as will be understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of 35 U.S.C. § 112(f), are not to be invoked unless the specific terms "means for" or "step for" are recited in a claim.

What is claimed is:

1. An apparatus of an optical scanner for scanning a subject, the apparatus comprising:
    interface circuitry including an input to receive an at least one image from at least one image-capture device of the optical scanner; and
    controller circuitry coupled to the interface circuitry and the input, the controller circuitry operative to process the at least one image to determine ranging between the optical scanner and the subject based on (a) projection of at least one aimer beam by an aimer transmitter system of the optical scanner to produce a corresponding at least one reflection off of a surface of the subject, and (b) detection of a position of the at least one aimer-beam reflection within the at least one image, wherein:
    the position of the at least one aimer-beam reflection within the image is a primary indicator of a distance between the surface of the subject and the at least one image-capture device of the optical scanner; and the at least one image includes a secondary indicator of the distance between the surface of the object and the at least one image-capture device, and wherein the secondary indicator is used in combination with the first indicator to detect an occurrence of an optical misalignment of the optical scanner;

the at least one reflection off of the surface of the subject comprises an aimer pattern; and the primary indicator of the distance between the surface of the subject and the at least one image-capture device of the optical scanner includes a distance between a centerline of the at least one imager and a midpoint position of the aimer pattern.

2. The apparatus of claim 1, wherein the optical scanner comprises an enclosure, and wherein the interface circuitry and the controller circuitry, the aimer transmitter system, and the at least one image-capture device are all housed within the enclosure.

3. The apparatus of claim 1, wherein the at least one image-capture device comprises at least a first image-capture device and a second image-capture device; and wherein a first image captured by the first image-capture device includes the primary indicator of the distance;

wherein a second image captured by the second image-capture device includes the secondary indicator of the distance; and wherein the controller circuitry is further operative to perform a first comparison of a first distance between the surface of the subject and the first image-capture device as represented by the primary indicator of the distance against a second distance between the surface of the subject and the second image-capture device as represented by the secondary indicator of the distance to produce an indication of the optical misalignment.

4. The apparatus of claim 1, wherein the controller circuitry is further operative to compute a value corresponding to an amount of the optical misalignment and determine a compensation value for the secondary indicator based on the computed value.

5. The apparatus of claim 1, wherein the at least one aimer beam comprises n beam(s), and wherein the controller circuitry is further operative to:

determine whether each of the at least one image contains an easy scene having exactly n beam reflections; and perform detection of the occurrence of any optical misalignment only in response to a positive determination of the at least one image containing an easy scene.

6. The apparatus of claim 1, wherein the at least one aimer beam includes two parallel beams, and wherein the secondary indicator of the distance between the surface of the object and the at least one image-capture device comprises a relative distance of the corresponding reflections of the two parallel beams.

7. The apparatus of claim 1, wherein the controller circuitry is further operative to perform detection of the occurrence of any optical misalignment in response to at least one of a passage of a predetermined amount of time, a predetermined number of activations, a malfunction of the optical scanner, a detection of a mechanical shock of the optical scanner, or a detection of a temperature change of the optical scanner, or a randomly determined interval.

8. An apparatus of an optical scanner for scanning a subject, the apparatus comprising:

interface circuitry including an input to receive an at least one image from at least one image-capture device of the optical scanner; and controller circuitry coupled to the interface circuitry and the input, the controller circuitry operative to process the at least one image to determine ranging between the optical scanner and the subject based on (a) projection of a pair of divergent aimer beams projected by an aimer transmitter system of the optical scanner to produce a corresponding pair of reflections off of a surface of the subject, and (b) detection of a position of at least one aimer-beam reflection of the pair of aimer-beam reflections within the at least one image;

wherein the pair of divergent aimer beams are divergent such that the pair of reflections, as captured in the at least one image by the at least one image sensor, are separated from one another by the same separation distance within each captured image, regardless of the ranging;

wherein any change in the separation distance is indicative of an occurrence of an optical misalignment of the optical scanner;

wherein each reflection off of the surface of the subject comprises an aimer pattern; and wherein an indicator of the distance between the surface of the subject and the at least one image-capture device of the optical scanner includes a distance between a centerline of the at least one imager and a midpoint position of the aimer pattern.

9. The apparatus of claim 8, wherein the controller circuitry is further operative to perform detection of the occurrence of any optical misalignment in response to any one of a passage of a predetermined amount of time, a predetermined number of activations, a malfunction of the optical scanner, a detection of a mechanical shock of the optical scanner, a detection of a temperature change of the optical scanner, or a randomly determined interval.

10. The apparatus of claim 8, wherein the at least one image-capture device is a single image-capture device.

11. An apparatus of an optical code scanner for scanning a subject, the apparatus comprising:

interface circuitry including an input to receive an at least one image from at least one image-capture device of the optical scanner; and controller circuitry coupled to the interface circuitry and the input, the controller circuitry operative to process the at least one image to determine ranging between the optical scanner and the subject based on (a) projection of a pair of divergent aimer beams projected by an aimer transmitter system of the optical scanner to produce a corresponding pair of reflections off of a surface of the subject, and (b) detection of a position of at least one aimer-beam reflection of the pair of aimer-beam reflections within the at least one image;

wherein the pair of divergent aimer beams are divergent such that the pair of reflections, as captured in the at least one image by the at least one image sensor, are separated from one another by the same separation distance within each captured image, regardless of the ranging;

wherein any change in the separation distance is indicative of an occurrence of an optical misalignment of the optical scanner; and wherein the controller circuitry is further operative to:

determine whether each of the at least one image contains an easy scene having exactly 2 beam reflections corresponding to the pair of divergent beams; and perform detection of the occurrence of any optical misalignment only in response to a positive determination of the at least one image containing an easy scene.

12. A scanning system, comprising:

at least one imager configured to capture at least one image of an item within a scene;

an aimer projection system configured to project at least one aimer beam causing an aimer pattern to be reflected off the item; and a controller circuitry operably coupled with the at least one imager and the at least one aimer transmitter, the controller configured to:

process the at least one image to determine ranging between the optical scanner and the item based on determining a relative distance of points within the aimer pattern and determining an aim-centerline distance defined as a distance between a centerline of the at least one imager and a midpoint position of the aimer pattern.

13. The scanning system of claim 12, wherein the aimer projection system is a multi-aimer projection system configured to project a plurality of aimer beams.

14. The scanning system of claim 13, wherein the plurality of aimer beams are parallel to each other.

15. The scanning system of claim 13, wherein the plurality of aimer beams are divergent relative to each other at an angle such that aimer spots of the aimer pattern maintain the same distance from one another as captured in the images by the at least one image capture device, regardless of distance.

16. The scanning system of claim 13, wherein the multi-aimer projection system includes a single aimer transmitter and a beam splitter to project the plurality of aimer beams.

17. The scanning system of claim 12, wherein the midpoint position of the aimer pattern is an average position of a set of aimer spots of the aimer pattern.

18. The scanning system of claim 12, wherein the controller is further configured to perform a calibration of the scanning system by compensating for imager displacement based on a determined error using the determined aim-centerline distance and a reliable reference distance based on the determined relative distance of points within the aimer pattern.

19. The scanning system of claim 18, wherein the compensation for the imager displacement includes compensation for both an x displacement and a y displacement of the at least one imager.

20. The scanning system of claim 12, wherein the controller is further configured to perform a focus sweep to locate the complete aimer pattern responsive to not detecting all aspects of the aimer pattern in the at least one image.

* * * * *